US006762873B1

(12) United States Patent
Coker et al.

(10) Patent No.: US 6,762,873 B1
(45) Date of Patent: Jul. 13, 2004

(54) METHODS OF DRIVING AN ARRAY OF OPTICAL ELEMENTS

(75) Inventors: Timothy M Coker, Peterborough (GB); William A Crossland, Cambridge (GB)

(73) Assignee: QinetiQ Limited, Farnborough (GB)

( * ) Notice: Subject to any disclaimer, the term of this patent is extended or adjusted under 35 U.S.C. 154(b) by 0 days.

(21) Appl. No.: 09/868,217

(22) PCT Filed: Dec. 16, 1999

(86) PCT No.: PCT/GB99/04275

§ 371 (c)(1), (2), (4) Date: Jan. 23, 2002

(87) PCT Pub. No.: WO00/38167

PCT Pub. Date: Jun. 29, 2000

(30) Foreign Application Priority Data

Dec. 19, 1998 (GB) ............................................ 9827945

(51) Int. Cl.[7] ............................................... G02B 26/00
(52) U.S. Cl. ........................ 359/290; 359/224; 359/230
(58) Field of Search ................................ 359/224, 230, 359/290, 291, 298; 427/162, 534; 345/96, 33, 209, 90, 92, 97

(56) References Cited

U.S. PATENT DOCUMENTS 4,859,035 A * 8/1989 Ichinose et al. .............. 349/37
5,598,284 A 1/1997 Kogushi et al. .............. 349/33
5,751,266 A * 5/1998 Crossland et al. ............ 345/96
5,774,104 A * 6/1998 Crossland et al. ............ 345/96

FOREIGN PATENT DOCUMENTS

| | | |
|---|---|---|
| EP | 0 856 767 | 8/1998 |
| GB | 2247974 | 3/1992 |
| WO | WO 92/04710 | 3/1992 |

* cited by examiner

*Primary Examiner*—Jordan M. Schwartz
*Assistant Examiner*—Jessica Stultz
(74) *Attorney, Agent, or Firm*—Nixon & Vanderhye P.C.

(57) ABSTRACT

Relates to writing an array of optical elements which are each switched between two states according to input data sets. In a first method, data is written in two steps in which different selected elements are respectively driven to one binary state and the other binary state. The selected elements of the two sets may be complementary, but are preferably only those which are required to change from their existing state. The latter criterion may be used in an alternative method using a single addressing of the array to turn elements in either direction as required. In a further method, as shown, selected elements only of a blank array are written in a first WRITE step so as to correspond with a set of data, and in a subsequent second ERASE step the selected elements are selectively erased to restore a blank array prior to writing and erasing another set of data. The methods have particular utility for maintaining a dc balance at pixels of a liquid crystal array.

20 Claims, 14 Drawing Sheets

| NSAR | NCO | CCO |
|---|---|---|
| 0 | 0 | 1 |
| 0 | 1 | 1 |
| 1 | 0 | 1 |
| 1 | 1 | 0 |

(a)

| NISE | NCO | CRO |
|---|---|---|
| 0 | 0 | 1 |
| 0 | 1 | 0 |
| 1 | 0 | 0 |
| 1 | 1 | 0 |

(b)

| NSAR | NC2 | NCR2' |
|---|---|---|
| 0 | 0 | 1 |
| 0 | 1 | 1 |
| 1 | 0 | 0 |
| 1 | 1 | 1 |

(c)

| NSAR | SAR |
|---|---|
| 0 | 1 |
| 1 | 0 |

METHODS OF DRIVING AN ARRAY OF OPTICAL ELEMENTS

This application in the U.S. national phase of International Application No. PCT/GB99/04275, filed Dec. 16, 1999, the entire content of which is hereby incorporated by reference.

BACKGROUND OF THE INVENTION

1. Field of the Invention

The present invention relates to methods of driving a array of optical elements. It has particular but not exclusive relevance to the driving of a spatial light modulator.

2. Discussion of Prior Art

The spatial light modulator to be described in relation to a preferred embodiment in this specification is a in the form of a smectic liquid crystal layer disposed between an active semiconductor backplane and a common front electrode. It was developed in response to a requirement for a fast and, if possible, inexpensive, spatial light modulator comprising a relatively large number of pixels with potential application not only as a display device, but also for other forms of optical processing such as correlation and holographic switching. Other aspects of this device are dealt with in our copending International Patent Applications of even filing and priority dates (PCT/GB99/04285, U.S. Ser. No. 09/868,219, priority GB9827952.4; PCT/GB99/04286 and PCT/GB99/04276, U.S. Ser. No. 09/868,230 and U.S. Ser. No. 09/868,220, both priority GB9827965.6; PCT/GB99/04282, U.S. Ser. Nos. 09/446,325 and 10/084,652, priority GB9827900.3; PCT/GB99/04279, U.S. Ser. No. 10/085,140, priority GB9827901.1; PCT/GB99/04274, U.S. Ser. Nos. 09/868,218 and 10/094,958, priority GB9827964.9; and PCT/GB99/04260 and PCT/GB99/04277, U.S. Ser. No. 09/868,242, both priority GB 9827944.1).

During the course of development of this spatial light modulator, a series of problems were encountered and dealt with, and the solutions to these problems (whether in the form of construction, function or method) are not necessarily restricted in application to the embodiment, but will find other uses. Thus not all of the aspects of the present invention are necessarily limited to liquid crystal devices, nor to spatial light modulators. Nevertheless, it is useful to commence with a discussion of the problems encountered in developing the embodiment to be described later.

The liquid crystal phase has been recognised since the last century, and there were a few early attempts to utilise liquid crystal materials in light modulators, none of which gave rise to any significant successful commercial use. However, towards the end of the 1960's and in the 1970's, there was a renewed interest in the use of liquid crystal materials in light modulating, with increasing success as more materials, and purer materials became available, and as technology in general progressed.

Generally speaking, this latter period commenced with the use of nematic and cholesteric liquid crystal materials. Cholesteric liquid crystal materials found use as sensors, principally for measuring temperature or indicating a temperature change, but also for responding to, for example, the presence of impurities. In such cases, the pitch of the cholesteric helix is sensitive to the parameter to be sensed and correspondingly alters the wavelength at which there is selective reflection of one hand of circularly polarised light by the helix.

Attempts were also made to use cholesteric materials in electro-optic modulators, but during this period the main thrust of research in this area involved nematic materials. Initial devices used such effects as the nematic dynamic scattering effect, and increasingly sophisticated devices employing such properties as surface induced alignment, the effect on polarised light, and the co-orientation of elongate dye molecules or other elongate molecules/particles, came into being.

Some such devices used cells in which the nematic phase adopted a twisted structure, either by suitably arranging surface alignments or by incorporating optically active materials in the liquid crystal phase. There is a sense in which such materials resemble cholesteric materials, which are often regarded as a special form of the nematic phase.

Initially, liquid crystal light modulators were in the form of a single cell comprising a layer of liquid crystal material sandwiched between opposed electrode bearing plates, at least one of the plates being transparent. Such cells were slow to operate and tended to have a short life due to degradation of the liquid crystal material. Quite early on it was recognised that the application of an average dc voltage to the liquid crystal cell was not beneficial, and at least in some cases produced degradation by electrolysis of the liquid crystal material itself, and schemes were evolved to render the average dc voltage to zero (dc balance).

It is now appreciated that other effects are also at work when a dc voltage is applied. When driving liquid crystal electro-optic devices for any length of time, a phenomenon known as image sticking may occur. Although the precise cause of this effect is unknown, there are theories that ions are trapped or a space charge is induced within the material in response to an overall dc field, and this results in a residual field even when the external dc field is removed. Whether to avoid electrolytic breakdown, or to avoid image sticking, it is evidently desirable that the time averaged voltage (that is, the average over the time that the voltage is actually being applied from an external source to the liquid crystal) applied to a liquid crystal material is zero.

The thickness of the liquid crystal layer in nematic cells is commonly around 20 to 100 microns, and there is a correspondingly small unit capacitance associated with a nematic liquid crystal cell. Furthermore, the switching time from a wholly "OFF" state to a wholly "ON" state tends to be rather long, commonly around a millisecond. Relaxation back to the "OFF" state can be somewhat longer, unless positively driven, but the "OFF" state is the only stable one.

At the same time, electro-optic nematic devices comprising a plurality of pixels were being devised. Initially, these had the form of a common electrode on one side of a cell and a plurality of individually addressable passive electrodes on the other side of the cell (e.g. as in a seven-segment display), or, for higher numbers of pixels, intersecting passive electrode arrays on either side of the cell, for example row and column electrodes which were scanned. While the latter arrangements provided considerable versatility, there were problems associated with cross-talk between pixels.

The situation was exacerbated when analogue (grey scale) displays were required by analogue modulation of the applied voltage, since the optical response is non-linearly related to applied voltage. Addressing schemes became relatively complicated, particularly if dc balance was also required. Such considerations, in association with the relative slowness of switching of nematic cells, have made is difficult to provide real-time video images having a reasonable resolution.

Subsequently, active back-plane devices were produced. These comprise a layer of liquid crystal material disposed between a back plane and a spaced opposed substrate. The backplane comprises a plurality of active elements, such as transistors, for energising corresponding pixels. Energisation normally involves cooperation with one or more counterelectrodes disposed on the opposed substrate, although it would be possible to provide counterelectrodes in the backplane itself for fields generally parallel to the plane of the liquid crystal layer.

Two common forms of backplane are thin film transistor on silica/glass backplanes, and semiconductor backplanes. The active elements can be arranged to exercise some form of memory function, in which case addressing of the active element can be accelerated compared to the time needed to address and switch the pixel, easing the problem of displaying at video frame rates.

Active backplanes are commonly provided in an arrangement very similar to a dynamic random access memory (DRAM) or a static random access memory (SRAM). At each one of a distributed array of addressable locations, a SRAM type active backplane comprises a memory cell including at least two coupled transistors arranged to have two stable states, so that the cell (and therefore the associated liquid crystal pixel) remains in the last switched state until a later addressing step alters its state. Each location electrically drives its associated liquid crystal pixel, and is bistable per se, i.e. without the pixel capacitance. Power to drive the pixel to maintain the existing switched state is obtained from busbars which also supply the array of SRAM locations. Addressing is again normally performed from peripheral logic and column and row addressing lines.

In a DRAM type active backplane, a single active element (transistor) is provided at each location, and forms, together with the capacitance of the associated liquid crystal pixel, a charge storage cell. Thus in this case, and unlike a SRAM backplane, the liquid crystal pixels are an integral part of the DRAM of the backplane. There is no bistability associated with the location unless the liquid crystal pixel itself is bistable, and this is not the case so far as nematic pixels are concerned. Instead, reliance is placed on the active element providing a high impedance when it is not being addressed to prevent leakage of charge from the capacitance, and on periodic refreshing of the DRAM location.

In contrast to the type of RAM associated with computing, the pixel circuits, and more significantly the pixel transistors, are often at least partially exposed to light. This can lead to problems, especially with DRAM type backplanes where the pixels are part of the DRAM circuit, including photo-induced conductivity and charge leakage. This aspect is dealt with in greater detail in our copending application PCT/GB99/04279, U.S. Ser. No. 10/085,140.

Thin film transistor (TFT) backplanes comprise an array of thin film transistors distributed on a substrate (commonly transparent) over what can be a considerable area, with peripheral logic circuits for addressing the transistors, thereby facilitating the provision of large area pixellated devices which can be directly viewed. Nevertheless, there are problems associated with the yields of the backplanes during manufacture, and the length of the addressing conductors has a slowing effect on the scanning. When provided on a transparent substrate, such as of glass, TFT arrays can actually be located on the front or rear surface of a liquid crystal display device.

In view of their overall size, the area of the TFT array occupied by the transistors, associated conductors and other electrical elements, e.g. capacitors is relatively insignificant. There is therefore no significant disadvantage in employing the SRAM configuration as opposed to the DRAM configuration. This sort of backplane thus overcomes many of the problems associated with slow switching times of liquid crystal pixels.

Generally, the active elements in TFT backplanes are diffusion transistors and the like as opposed to FETS, so that the associated impedances are relatively low and associated charge leakage relatively high in the "OFF" state.

Semiconductor active backplanes are limited in size to the size of semiconductor substrate available, and are not suited for direct viewing with no intervening optics. Nevertheless their very smallness aids speed of addressing of the active elements. This type of backplane commonly comprises FETs, for example MOSFETs or CMOS circuitry, with associated relatively high impedances in the "OFF" state.

However, the smallness also means that the area of the overall light modulation (array) area occupied by the transistors, associated conductors and other electrical elements, e.g. capacitors can be relatively significant, particularly in the SRAM type which requires many more elements than the DRAM type. Being opaque to visible light, a semiconductor backplane would provide the rear substrate of a light modulator or display device.

At a later period still, substantial development occurred in the use of smectic liquid crystals. These have potential advantages over nematic phases insofar as their switching speed is markedly greater, and with appropriate surface stabilisation the ferroelectric smectic C phases should provide devices having two stable alignment states, i.e. a memory function.

The thickness of the layer of liquid crystal material in such devices is commonly much smaller than in the corresponding nematic devices, normally being of the order of a few microns at most. In addition to altering the potential switching speed, this increases the unit capacitance of a pixel, easing the function of a DRAM active backplane in retaining a switched state at a pixel until the next address occurs.

However, as the liquid crystal thickness approaches the thicknesses associated with the underlying structure of the backplane, and any possible deformation of the liquid crystal cell structure by flexing or other movement of the substrates, problems arise, for example as to the uniformity of response across the pixel area, and the capability for short circuiting across the cell thickness. These factors are dealt with in more detail in our copending applications PCT/GB99/04285, U.S. Ser. No. 09/868,219; and PCT/GB99/04282, U.S. Ser. Nos. 09/446,325 and 10/084,652.

The possibility of long relaxation times, or even of bistability, of the liquid crystal cell or pixel, facilitates the introduction of a relatively new digital technique when a grey scale image is required, in which pixels are turned "ON" for a fraction of the viewing period according to the grey level. Essentially, the image is computationally decomposed to a series of bit planes in which each pixel is either "ON" or "OFF", the bit planes being sequentially displayed. In a preferred form, the (normally binary) weighted bit plane technique, the durations of the bit planes are weighted thereby reducing the number of bit planes required to synthesise an image, and reducing addressing requirements somewhat.

Pixel Structure—Switching and Address Times When using a SRAM type backplane to switch a capacitive element the time necessary to address the location on the backplane can be as small as is necessary to switch that location, regardless of whether the capacitive element has responded. The location is always coupled to the power supply, and can continue to supply power (current/voltage) to the capacitive element after the addressing pulse has ceased.

By contrast, power is supplied to a capacitive element from a DRAM location only while addressing is taking place, after which the active element (transistor) is turned off. If the addressing pulse is insufficiently long for transfer of the requisite amount of charge, the capacitive element is incompletely switched. This is likely to occur, for example, when the capacitive element includes ferroelectric material, as in some smectic liquid crystal cells, and the addressing time is short, for example in a large scale array.

One solution is to provide an additional "slug" capacitance which is rapidly charged during the addressing pulse and so can provide a reservoir of charge while the capacitive element switches over a longer time period. This aspect is dealt with in more detail in our copending application PCT/GB99/04279, U.S. Ser. No. 10/085,140, which relates to the provision of a semiconductor active backplane including an array of addressable active elements on a semiconductor substrate for energising respective first electrodes, wherein at least part of the region beneath a said electrode is adapted to act as a capacitor. In particular said part may be formed as a depletion region whereby in use it acts as a reverse biassed diode, or individual capacitor plates may be formed beneath the electrode, one coupled to the substrate and the other coupled to the electrode.

Smectic Liquid Crystal Electro-Optic Cells In the smectic liquid crystal phase, the molecules exhibit positional order ("layers") in addition to the orientational order exhibited by the cholesteric and nematic phases. There are a number of different smectic sub-phases which differ in the orientational order within the overall structure of the smectic layers, the most common being the smectic A phase (SmA) and the smectic C phase (SmC).

The common alignment for smectic materials is planar (molecules generally parallel to the major cell surfaces) with the smectic layers normal to the plane of the cell, as this permits the field to be applied across the cell thickness. It is possible to obtain homeotropic alignment with the smectic layers in the cell plane, and such a device could provide a fast refractive index modulator. However, in order to apply appropriate electric fields for switching, very small electrode gaps are required and therefore such devices tend to have very small active areas, and as a consequence this type of device is relatively uncommon.

In the smectic A phase the director is normal to the plane of the layers. Application of an electric field perpendicular to the director causes the latter to tilt about an axis parallel to the applied field by an amount approximately linearly dependent of field strength, making it possible to achieve analogue grey scale modulation. Polarisation of the light is affected, so that intensity or phase modulation may be achieved, and since the rotation of the director is in the plane of the cell, normally incident light is always perpendicular to the optic axis of the material. Coupled with the thinness of the cell, this leads to improved viewing angles for such devices. This effect, called the electroclinic effect, is extremely fast, switching times down to around 100 nanoseconds having been observed.

In the smectic C phase, the director forms a constant ("tilt") angle with the plane of the smectic layers. The tilt angle depends on the material and the temperature, and defines a cone with its tip on the smectic layer and its axis normal to the layer, all possible positions of the director lying on the cone surface. In the bulk of a chiral smectic C phase (SmC*) the director precesses from layer to layer as in a helix.

In the chiral smectic C phase, liquid crystal materials are ferro-electric, having a permanent dipole, sometimes termed spontaneous polarisation ($P_s$). In the bulk material, P, rotates in the plane of the layer as the director precesses, so no net effect is observable. Bulk ferro-electricity can be observed if the precession is suppressed, either by surface stabilisation of the director positions such that only the two orientations of director which lie in the plane of the device are possible, and/or by back-doping with a chiral material of the opposite hand.

Smectic C* materials can be broadly divided into two classes known as high and low tilt materials respectively. Class I materials have the phase sequence isotropic-nematic-smectic A*-smectic C*, and tend be low tilt materials, having tilt angles generally grouped up to around 22.5° (cone angle of 45°); class II materials have the phase sequence isotropic-nematic-smectic C*, and tend to be high tilt materials with greater tilt angles. Materials with a cone angle greater than 75° are rare, although for holographic applications, which require phase modulation, a cone angle of 90° would be ideal.

With low tilt materials, the smectic layers are inclined relative to the cell surface rather than at right angles, such that the director cone has a tilted axis and its surface is tangential to the cell surface. For high tilt materials the cone axis is normal to the cell surface.

When the structure is surface stabilised, then in theory, at least for Class I materials there is no preference between the two states of a low tilt material and a bistable structure should result. Surface stabilisation can be achieved simply by making the layer in the cell thin. The two states will have different effects on polarised light, and so can provide intensity or phase modulation. In practice, it is very difficult or impossible to obtain true bistability, especially on silicon backplanes and there will a slight preference for one state over the other. Nevertheless, this should give rise to relatively long relaxation times.

For high tilt materials, the two states are not equal, and one state is preferred over the other, so that there is monostability in the absence of any other factor. The two states are such that phase modulation of light may be obtained, and, indirectly, intensity modulation, e.g. in holographic applications. Both high and low tilt materials may be used in the spatial light modulator of the invention.

Stability/Relaxation The presence of the spontaneous polarisation, and its realignment as the liquid crystal molecules realign under the influence of an electric field, leads to a significant additional current or charge flow during realignment, e.g. between electrodes either side of a smectic layer. A pixel of area A will consume a charge of $2AP_s$ during switching. This factor is particularly important when pixel switching is controlled by a DRAM type of active backplane, when pixel capacitance and $P_s$ become important design parameters. It should also be noted that charge consumption reduces the field across the electrodes in such devices if the addressing pulse is insufficiently long to accommodate pixel switching, as in the present preferred embodiment.

As has already been noted, the use of the backplanes described herein is not limited to liquid crystal devices. However, these backplanes are particularly suited for use in the manufacture of liquid crystal devices. Again, although it is possible to employ nematic or cholesteric materials in such devices, it is preferred to employ smectic materials because of their faster switching action.

Other reasons for preferring smectic materials are the fast switching times; and, in the case of using a DRAM type active backplane (this does not apply when the backplane is the SRAM type since power/current can be continuously applied to each pixel), the ability to extend the relaxation time, or even to obtain a bistable effect, once the pixel has been placed in the desired state. One advantage of having a fast switching time in the case where relaxation occurs lies in the increase of the fraction of the pixel repeat address period usable for viewing time. Another advantage, particularly where optical processing is concerned is the increase in data throughput.

Electrostatic Stabilisation The charge consumption which occurs when a pixel is switched in one direction gives rise to a corresponding generation of charge when the pixel switches in the other direction. Therefore, if a switched pixel is completely electrically isolated, charge cannot flow and the pixel cannot relax. In operation of a DRAM type array, this may be effected by turning off all the transistors of the array, and in the preferred embodiment this is made possible by applying a global reset signal NRAR to the row scanners. Also, in some embodiments of addressing scheme, all the transistors are left in the off state once all the rows in the frame have been scanned, until the start of the next frame scan. (Other embodiments of addressing scheme, including those with ac stabilisation, do require transistors to be left on).

In practice, charge leakage cannot be completely eliminated, and so relaxation will occur, but over an extended period. A common cause of charge leakage is photoconductivity associated with the slug capacitance mentioned earlier and/or photoconductive or other leakage currents in the associated switching transistor of the DRAM array.

Electrical isolation is thus a useful but imperfect tool for prolonging relaxation times. It will be appreciated that whether a long relaxation time is achieved through an appropriate choice of material and cell design, or by electrical isolation, the important factor is that sufficient time can be allowed between successive addressings of any pixel for it to be maintained essentially in its desired state.

AC Stabilisation During relaxation, the director rotates out of the plane of the device to the alternative position. If an electric field is applied to a material, the field itself induces a polarisation of the material, and the polarisation reacts to the field, resulting in a torque that is proportional to the square of the field and so independent of field polarity. With a material having negative dielectric anisotropy this torque acts to maintain the molecule in the plane of the pixel, thereby "locking" the liquid crystal director orientation in either of its switched states. Thus the continuous application of an alternating electrical field between successive addressings (which at least in some cases is of low amplitude relative to the switching voltage) prevents relaxation of the director to the alternative orientation. Any tendency for the director to rotate from either of the two preferred orientations is effectively immediately counteracted by the ac field which returns the director to the orientation that it should have. The effect should obtain for as long as the ac field is present, so that the device behaves as if it were bistable.

In a DRAM array device this effect can be obtained by globally turning on all of the DRAM switching transistors, applying the same dc signal (e.g. zero or V volts) to all of the column electrodes, and by applying an ac voltage to the common front electrode with dc level corresponding to that applied to the column electrodes.

This endless prolongation of the switched pixel states is particularly important in certain types of optical processing where the same optical state may need to be maintained for days, months or even years.

It is therefore clear that during operation of the array it would be desirable to be able simultaneously to enable a plurality of the rows, and more preferably all the rows, so that all of the enabled pixels down each column may be brought simultaneously to the same state. This has already been mentioned in connection with the provision of blanking and ac stabilisation for prolonging the switched state of a pixel, and it is also desirable insofar as it permits the length of time that a dc pulse of potential is applied to be clearly and precisely defined, which is desirable when considering dc balancing. Following such enabling, and where as stabilisation is not used, it is also desirable to disable the enabled transistors, preferably a global disable over the entire array, to prevent relaxation due to short circuiting of a liquid crystal cell, for example.

In the embodiment to be described hereafter, where the parallel data fed to the columns is identical, and all of the rows are enabled, the whole array can be brought to zero or one, thereby blanking the array. If the parallel data along the columns is varied, a vertically striped image is produced.

If the potential difference between the front electrode and the columns during blanking is zero, the pixels will be short circuited, thereby permitting relaxation to take place. Alternatively, the potential difference may be a positive or negative dc, thus driving all of the pixels relatively rapidly on or off. If the dc potential difference is zero but a small ac voltage is present, preferably on the common front electrode for ease of application, in certain circumstances the pixels can be maintained in their existing states, as described in more detail elsewhere in this specification (ac stabilisation).

Our copending application PCT/GB99/04274, U.S. Ser. Nos. 09/868,218 and 10/094,958 relates to the provision of an array of electrically addressable elements, said array comprising a plurality of mutually exclusive sets of said elements, means arranged to address said sets one at a time, and means for addressing more than one (and preferably all) of said plurality of sets (the "selected sets") simultaneously. While the most common form of array is arranged as addressable rows (the sets) and columns, other arrangements are possible, for example based on polar co-ordinates (distance and angle). However, modern computing methods and standards converters have tended to make other formats redundant in the majority of cases.

Although, as will be seen, the facility of being able to address all pixels of the array simultaneous is highly desirable in practising the methods of the present invention, it is not essential, and there are cases where the simultaneous addressing step could be replaced by a further writing operation.

SUMMARY OF THE INVENTION

The present invention is intended to facilitate the achievement of dc balance while driving an array of binary elements.

In a first aspect, the present invention provides a method of writing an array of optical elements in a succession of cycles to alter their states according to respective ones of a series of input data sets, each cycle comprising a first step wherein selected elements only of an optically blank of uniform array are written as determined by a respective data set, and a second step wherein the selected elements are selectively erased to restore a blank array prior to another cycle.

In a second aspect, the invention provides an electro-optic arrangement comprising an array of electro-optic elements and control means responsive to a series of input data sets, the control means being arranged to respond to each data set so that starting with an optically blank or uniform array of elements in a first step selected elements are written as determined by the data set, and in a second step the selected elements are selectively erased to revert to a blank array prior to writing elements as determined by a successive data set.

The array of optical/electro-optic elements may comprise a corresponding array of addressable active elements (e.g. pixel electrodes for example formed on an active backplane, preferably a semiconductor backplane), and an electrode spaced from said corresponding array, each optical/electro-optic element being defined between said electrode and a corresponding active element. The spaced electrode may be common to all elements of the array.

In one preferred form of the method, during the first step the active elements and the spaced electrode are operated to apply a first potential difference across the selected optical/electro-optic elements, and during the second step the active elements and the spaced electrode are operated to apply a second potential difference across the selected elements, the first and second potential differences having opposite signs, and, preferably, equal amplitudes.

More preferably, the potential applied to the spaced electrode may be switched between first and second values, with the output of the whole array of addressable active elements also being similarly switched between said first and second values of potential substantially synchronously with the switching of the front electrode. The potential applied to said first electrode may have the second value only during said second step.

The optical/electro-optic elements may comprise liquid crystal material located between the array and the spaced electrode, and they may be bistable or monostable.

It is desirable that between the first and second steps all the elements of the array are simultaneously addressed to impose zero potential difference thereacross. This serves effectively to provide a defined period for each individual element during which dc has been applied across it, and so enables dc balance to be more precisely determined.

In the preferred embodiment, the array comprises a plurality of mutually exclusive sets of the optical/electro-optic elements, means arranged to address the sets one at a time, and means for addressing more than one (and preferably all) of said plurality of sets (the "selected sets") simultaneously. In such a case, a preferred method of producing a binary image includes the step of simultaneously addressing all the elements of the array once they have been written. During this step the elements are subjected to a common signal such that they receive (a) an ac signal, for ac stabilisation; or, for electrostatic stabilisation or for other purposes (for example providing a clearly defined time during which a dc signal is applied for dc balancing purposes) either (b) zero volts; or (c) a finite dc voltage. Where dc or zero volts is applied, this may be subsequently terminated by application of an ac stabilising signal, or by turning the elements off, i.e. open circuit, for electrostatic stabilisation.

UK Patent Application Serial No GB2247974A is directed to refreshing an existing image in a manner designed to avoid dc imbalance, effectively involving image reversal. It is not directed to writing of a new image or images, nor is there any teaching concerning the writing of a succession of (different) images so as to maintain dc balance. In a first embodiment all elements of the array are addressed by a positive or negative voltage during each array scan. In cases where there is a fixed front electrode voltage, it is understood that all the column electrodes are addressed with positive or negative voltages so as to write a full (inverted or negative) array of pixels in the normal way during a single scan, followed by rewriting of the non-inverted image. In cases where there is an alternating front electrode voltage, after driving all pixels to the same optical state (blanking), the state of a selected set pixels is reversed to give a fully written array. The array is subsequently blanked to the opposite optical state and the state of the complementary set of pixels is reversed to give the same optical written array. This type of blanking is unnecessary in the present invention.

UK Patent Application Serial No. GB2173336A is also concerned with dc balancing of liquid crystals which switch only above a threshold voltage. A row, or set of rows is blanked, followed by the application of column data in the form of dc balanced bipolar data pulses together with a dc strobe pulse on the row. The latter pulse coacts with one of the bipolar data pulses but not with the other, to change the state of a pixel. The overall polarity of the set-up, including the polarity of the strobe and blanking pulses, is periodically inverted (regularly or randomly) to maintain overall dc balance. The methods of present invention do not necessitate blanking, but rather they could be regarded as requiring selective alteration of pixels as needed.

International Patent Application No. WO 92/04710 disclosed a scheme in which any liquid crystal element is only driven on or off when a change of state therein is required, otherwise it remains unaddressed. Each pixel can therefore be subjected only to alternate turn-on and turn-off pixel pulses of well-defined and equal lengths, thus automatically affording dc balance in the long term.

The use of intervening uniformly blank images in the manner required by the present invention is not disclosed in this prior art.

BRIEF DESCRIPTION OF THE DRAWINGS

Further features and advantages of the invention can be derived from a consideration of the appended claims, to which the reader is referred, and of the following description of an embodiment of the invention made with reference to the accompanying drawings, in which:

DETAILED DISCUSSION OF EMBODIMENTS

Figure 1:
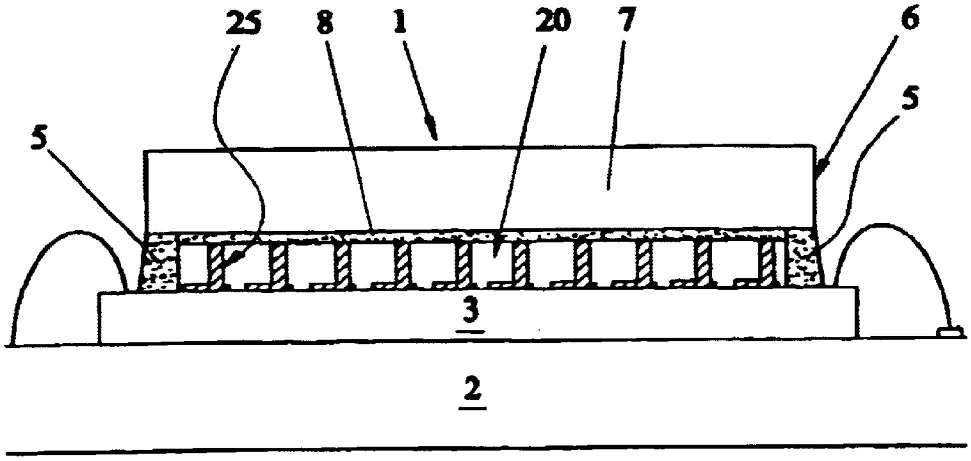
FIG. 1 shows in schematic cross-sectional view a liquid crystal cell which incorporates an active backplane and is mounted on a substrate.

FIG. 1 shows in schematic cross-sectional view a liquid crystal cell 1 mounted on a thick film alumina hybrid substrate or chip carrier 2. The cell 1 is shown in exploded view in FIG. 2. The use of a hybrid substrate for mounting electro-optic devices is discussed in more detail in our copending application PCT/GB99/04285, ref: P20957WO.

Figure 2:
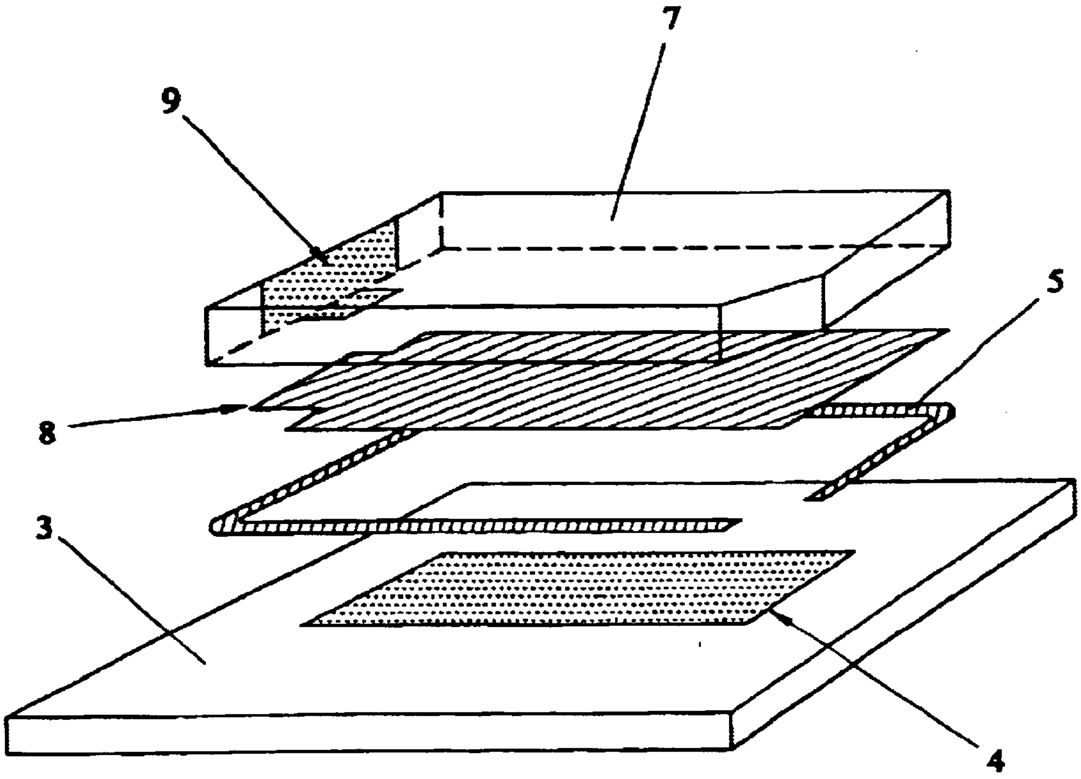
FIG. 2 is an exploded view of components of the liquid crystal cell of FIG. 1.

Cell 1 comprises an active silicon backplane 3 in which a central region is formed to provide an array 4 of active mirror pixel elements arranged in 320 columns and 240 rows. Outside the array, but spaced from the edges of the backplane 3, is a peripheral glue seal 5, which seals the backplane 3 to the peripheral region of a front electrode 6. FIG. 2 shows that the glue seal is broken to permit insertion of the liquid crystal material into the assembled cell, after which the seal is completed, either by more of the same glue, or by any other suitable material or means known per se.

Front electrode 6 comprises a generally rectangular planar glass or silica substrate 7 coated on its underside, facing the backplane 3, with a continuous electrically conducting silk screened indium-tin oxide layer 8. On one edge side of the substrate 7 is provided an evaporated aluminium edge contact 9, which extends round the edge of the substrate and over a portion of the layer 8, thereby providing an electrical connection to the layer 8 in the assembled cell 1.

Insulating spacers 25 formed on the silicon substrate of the backplane 3 extend upwards to locate the front electrode 6 a predetermined, precise and stable distance from the silicon substrate, and liquid crystal material fills the space so defined. As described later, the spacers 25 and the backplane 3 are formed on the silicon substrate simultaneously with formation of the elements of the active backplane thereon, using all or at least some of the same steps.

Figure 3:
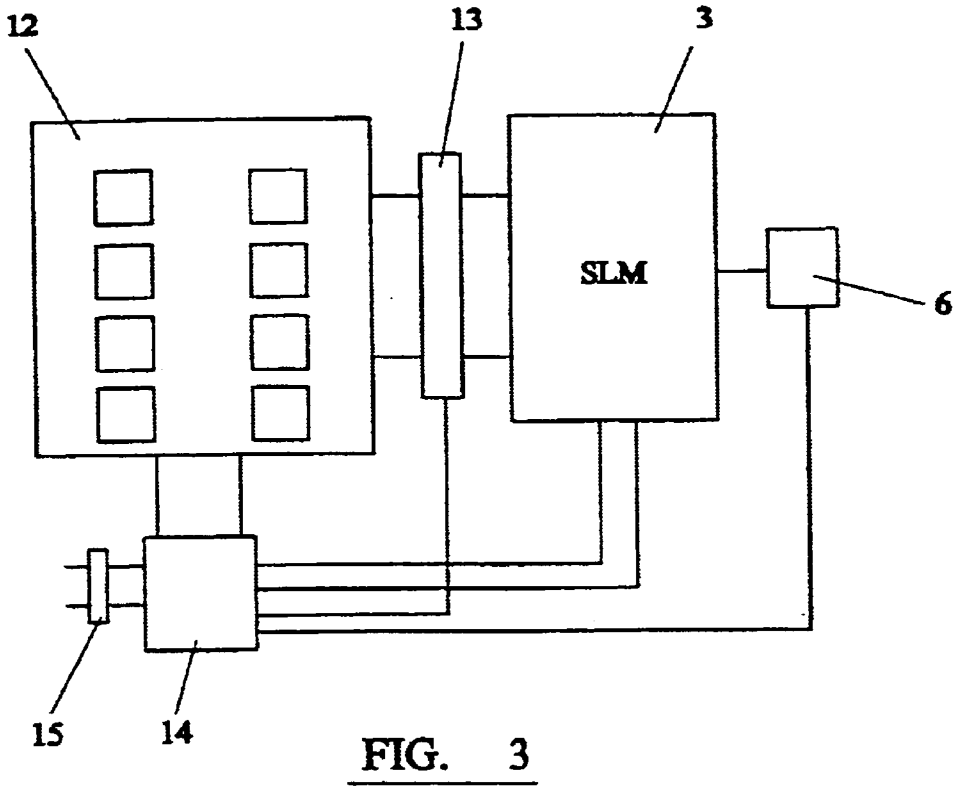
FIG. 3 is a schematic block circuit diagram of part of the interface of FIG. 3 showing circuitry closely associated with the liquid crystal cell.

FIG. 3 is a schematic outline of circuitry on the PCB 11 closely associated with operation of the cell 1, here shown schematically as backplane 3 and front electrode 6. Backplane 3 receives data from a memory 12 via an interface 13, and all of the backplane 3, front electrode 6, memory 12 and interface 13 are under the control of a programmable logic module 14 which is itself coupled to the parallel port of a PC via an interface 15.

Figure 4:
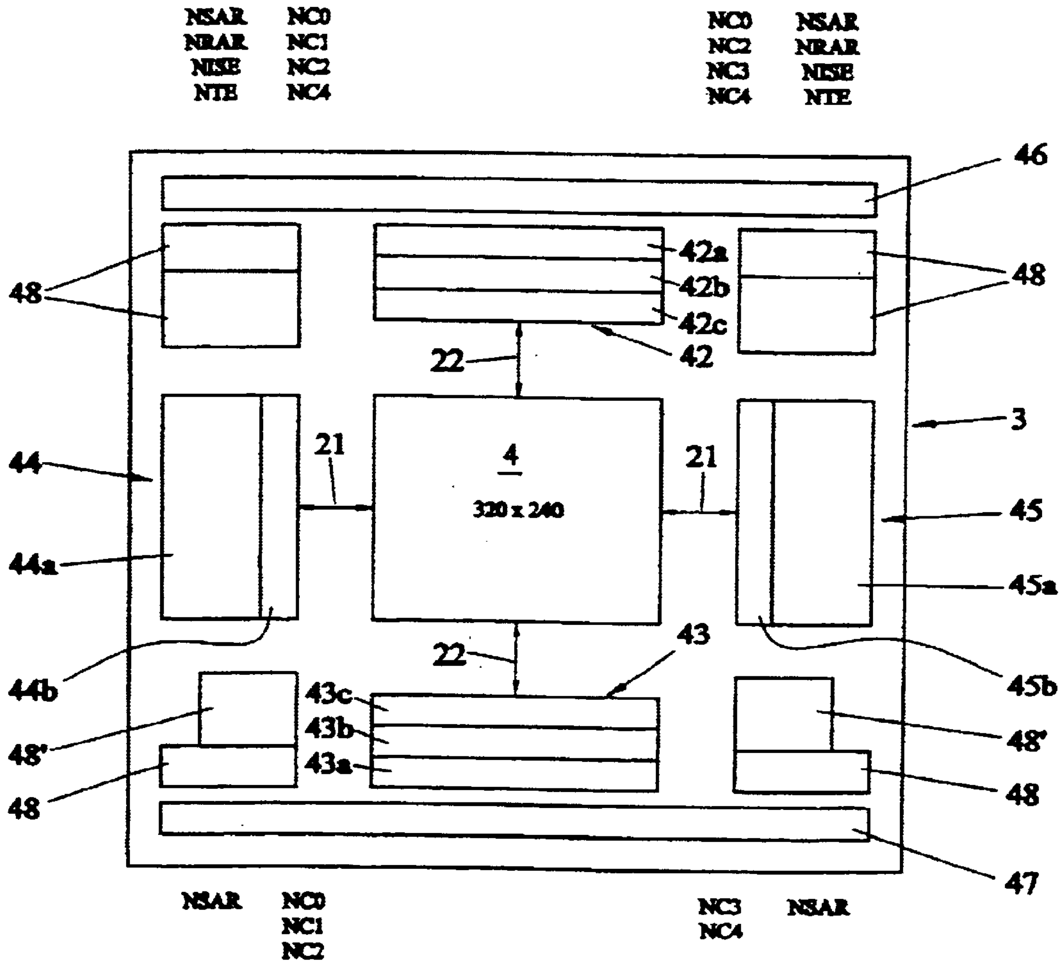
FIG. 4 is a schematic plan view (floorplan) of the active backplane of the liquid crystal cell of FIG. 1, including a central pixel array.

FIG. 4 shows a general schematic view of the layout ("floorplan") of the active backplane 3. As will be described in detail later with reference to FIGS. 5 and 6, each one of the central array 4 of pixel active elements is composed essentially of an NMOS transistor having a gate connected to one of a set of a row conductors, a drain electrode connected to one of a set of column conductors and a source electrode or region which either is in the form of a mirror electrode or is connected to a mirror electrode. Together with an opposed portion of the common front electrode 6 and interposed chiral smectic liquid crystal material 20, the rear located mirror electrode forms a liquid crystal pixel cell which has capacitive characteristics.

Odd and even row conductors are connected 21 to respective scanners 44, 45 spaced either side of the array. Each scanner comprises a level shifter 44*b*, 45*b* interposed between a shift register 44*a*, 45*a* and the array. In use, a token signal is passed along the registers to enable (render the associated transistors conductive) individual rows in turn, and by suitable control of the registers different types of scan, e.g. interlaced or non-interlaced, can be performed as desired.

Odd and even column conductors are connected 22 to respective drivers 42, 43 spaced from the top and bottom of the array. Each driver comprises a 32 to 160 demultiplexer 42*a*, 43*a* feeding latches 42*b*, 43*b*, and a level shifter 42*c*, 43*c* between the latches and the column conductors. In use, under the control of a 5-phase clock, data from the memory 24 for successive sets of 32 odd or even column conductors is passed from sets of edge bonding pads 46, 47 to the demultiplexers 42*a*, 43*a*, and latched at 42*b*, 43*b* before being level shifted at 42*c*, 43*c* for supply as a driving voltage to the column conductors. Synchronisation between the row scanning and column driving ensures that the appropriate data driving voltage is applied via the enabled transistors of a row to the liquid crystal pixels, and for this purpose various control circuits 48 are provided.

Subsequent disabling of that row places the transistors in a high impedance state so that charges corresponding to the data are then maintained on the capacitive liquid crystal pixels for an extended period, until the row is again addressed, for example either for writing another image (or rewriting the same image) or for stabilising the existing image.

Figure 5:
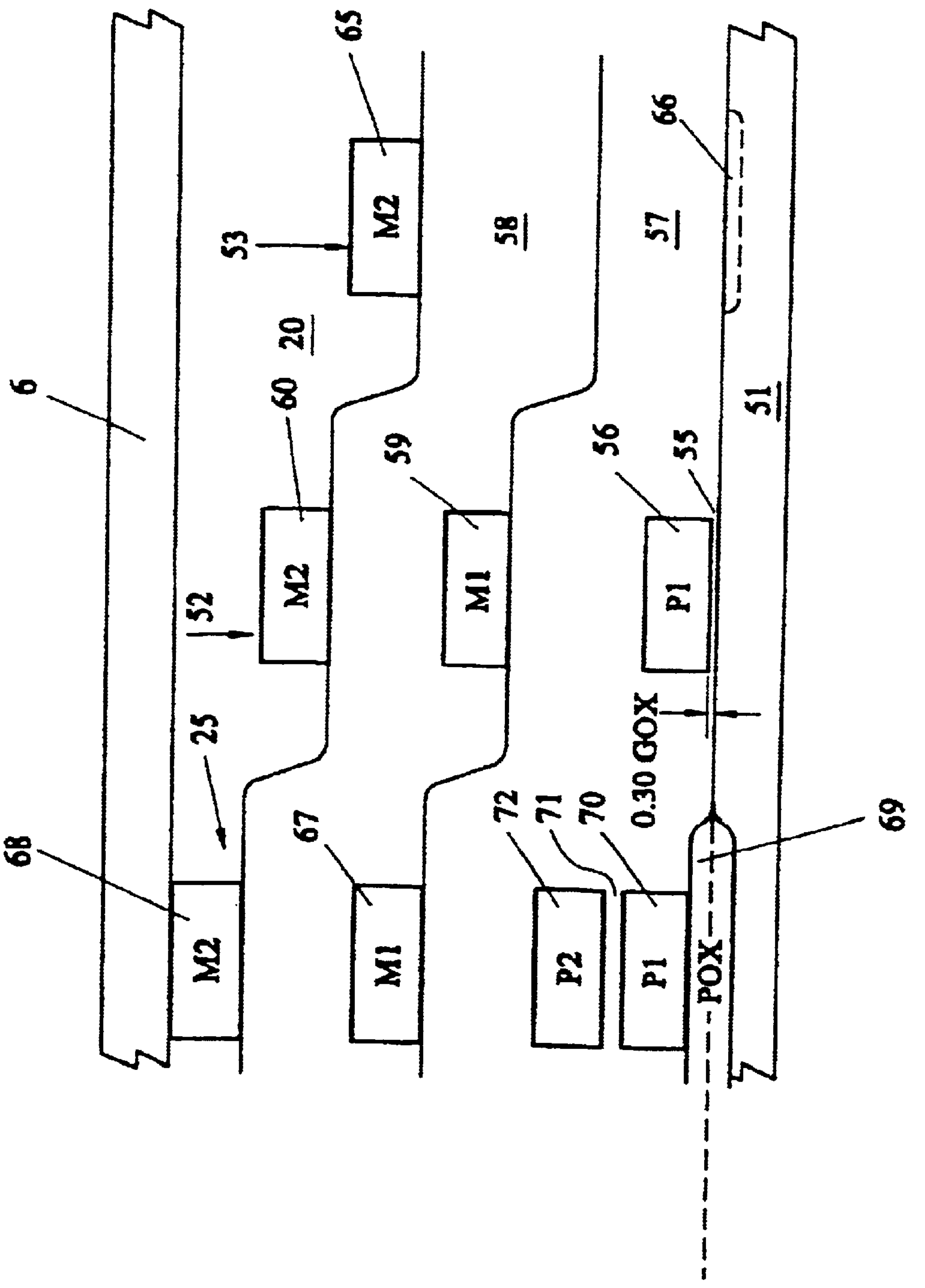
FIG. 5 is a schematic cross sectional view of part of the backplane of FIG. 4 to illustrate the various layers and heights encountered in the region of the pixel array.

As schematically illustrated in FIG. 5, the active backplane is based on a p-type silicon substrate 51. In the region of the array 4 it includes NMOS transistors 52, pixel mirrors 53 and the insulating spacer columns 25, and the substrate 51 is covered first by a lower substantially continuous silicon oxide layer 57 and then by an upper substantially continuous silicon oxide layer 58. Insulating ridges constructed similarly to the spacers and of similar height are formed outside the region of the array 41. The function of the insulating pillars and ridges is to ensure a constant and accurate spacing between the front electrode 22 and the silicon substrate 51, to prevent short circuits between the backplane and the front electrode and to provide electrical and optical uniformity and behaviour in the liquid crystal pixel array.

Figure 6:
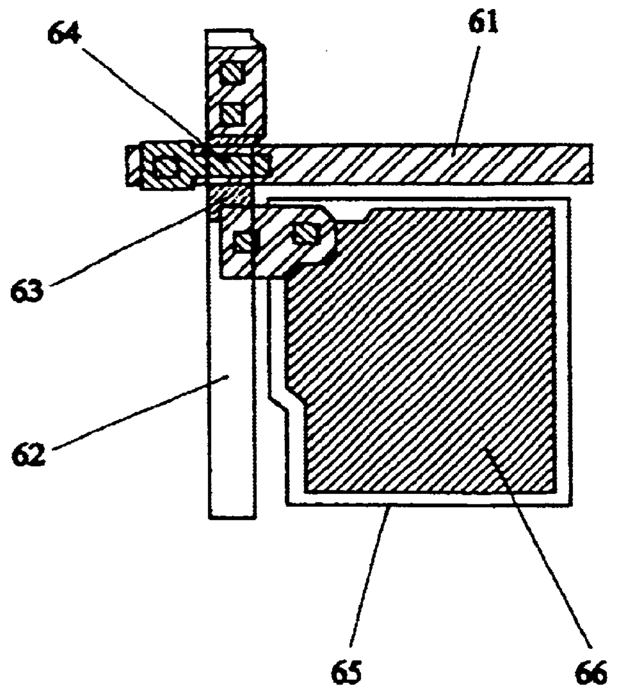
FIG. 6 is a schematic plan view of a single pixel of the array of the backplane of FIG. 4.

It should be noted that FIG. 5 is included merely to illustrate the different heights encountered in the backplane and that the other spatial arrangements of the elements do not necessarily correspond to what is found in practice. FIG. 6 shows a plan view of an actual arrangement of transistor and mirror electrode, generally similar to that of FIG. 5, but with the column 25 not shown. Transistors 52 are the highest part of the circuitry itself.

In addition to these layers, the transistor 52 is further defined by a metallic gate electrode 59 on the layer 57 and a metallic drain electrode 60 on layer 58. Electrodes 59 and 60 are connected to a row conductor 61 and a column conductor 62 respectively. At the transistor 52, the layer 57 is modified to include a polysilicon region 56 spaced from the substrate 51 by a very thin gate oxide layer 55.

The transistor source is in the form of a large diffusion region 63 within the layer 58 which is connected to electrode 65 of the pixel mirror 53, with the gate region 64 being located essentially under the crossover region of the column and row conductors 61, 62 to maximise the fill factor and to protect it from incident light.

The pixel mirror is formed by the pixel electrode 65 on layer 58, which electrode is of the same metal as, and formed simultaneously with, the drain electrode 60. Beneath most of the mirror electrode 65 there is formed a depletion region 66 in the substrate 51. In the assembled device, the pixel electrodes are spaced from the opposed front electrode by somewhat less that 2 microns with smectic liquid crystal material 20 interposed.

The pixel mirror is essentially flat, since there are no underlying discrete circuit elements, and occupies a proportion (fill factor) of around 65% of the pixel area. The need to maximise the fill factor is one consideration in the decision to employ a DRAM type backplane, rather than the SRAM type in which more space needs to be devoted to the two transistors and their associated elements.

An insulating column or pillar 54 which is associated with each pixel extends above the topology of the rest of the backplane 21, but is also composed of the layers 57, 58 over the substrate 51, with a first metal film 67 between the layers 57, 58 and a second metal film 68 between layer 58 and (in use) the front electrode 22. First and second metal films 67, 68 are of the same metals, and deposited at the same time, as the electrodes 59, 60 of the transistor 52. In the region of the spacer, the substrate is modified to provide a field oxide layer 69, and the bottom of layer 57 is modified to provide two polysilicon layers 70, 72 spaced by a thin oxide layer 71.

Although it includes metallic layers, the spacer provides good insulation between the front electrode and the active backplane. By forming insulating spacers in this manner, it is possible to locate them accurately relative to other elements on the backplane, thereby avoiding any interference with optical or electrical properties, and by creating them at the same time as the active and other elements of the backplane, using the same processes, there are advantages in terms of cost and efficiency.

As mentioned above, a pixel cell thus formed has capacitance. Chiral smectic liquid crystal materials are ferroelectric, so that application of an electric field sufficient to cause realignment of the molecules is associated with an additional transfer of charge. This effect is associated with a time constant insofar as the liquid crystal material takes time to realign.

The requirement for charge to flow during realignment, and the associated time constant, have a number of consequences. In particular, while the realignment can be relatively fast, it may still be much less than is required for fast scanning of the device.

With a SRAM type backplane, the state of a pixel is retained until the next address, and with power being supplied from a bus current can be supplied until realignment has been completed. However, with a DRAM type backplane, power is supplied to each pixel only during the addressing period. The capacitance of the cell is relatively small, and cannot retain sufficient charge for realignment to be completed.

One way of dealing with this problem is to provide each pixel with an additional "slug" capacitance which is quickly charged when the pixel is addressed, its charge thereafter being consumed as the liquid crystal molecules realign and subsequent pixels are being addressed. Thus the slug capacitance effectively avoids the need for an addressing pulse as long as the realignment time.

In FIG. 5, the diffusion layer 66 forms in use a reverse biassed diode, the depletion region of which acts as the slug capacitance.

The smectic liquid crystal used in the embodiment has a monostable alignment, so that for the DRAM type pixel element to remain in the switched state until it is next addressed, it is essential to limit charge leakage. In a sense, the fact that there is an additional charge displacement during realignment is helpful, in that the amount of charge leakage to permit relaxation to the original state is relatively large.

Unlike a conventional encapsulated computer DRAM, illuminating light can penetrate to the backplane. If it reaches sensitive elements, photoconductivity can permit relaxation of the pixel in less time than the scanning period, and this should not be allowed to happen. Steps therefore need to be taken (a) to reduce light penetration to sensitive elements as far as possible; and (b) to alleviate the effects of any light which nevertheless still penetrates.

In FIGS. 5 and 6, step (a) is implemented insofar as the transistor 52, and particularly its gate region, is located substantially beneath metallic conductors 60, 61 and in that the diode provided by region 66, which is especially photosensitive, is largely hidden by the mirror layer 65. Further details regarding the slug capacitance and the avoidance of photoconductive effects will be found in our copending application PCT/GB99/04279, U.S. Ser. No. 10/085,140.

While the fill factor of 65% in the arrangements of FIGS. 1 to 6 is sufficiently high to be acceptable, the reflectivity of the mirror electrode is not optimise, since the material thereof is identical to that used in producing the active elements of the backplane.

It is normal semiconductor foundry practice to supply backplanes with a continuous top insulating layer deposited over the entire plane, and to produce the arrangements of the preceding Figures, it would be necessary to remove this insulating layer, or to avoid having it applied in the first place.

However, by the use of partial or full planarisation of the backplane, the fill factor and reflectivity of the mirror electrode can be increased.

In partial planarisation the top insulating layer is retained, but with vias extending to underlying electrode pads 65, which can be small as they no longer function as mirrors. A respective highly reflective mirror coating is deposited over the majority of the pixel area and is connected to its via.

This construction has advantages, inter alia, of a high fill factor; a highly reflective mirror electrode; and reduced light penetration to the underlying semiconductor material. While it is preferred to retain the insulating columns and ridges to support and space the front electrode relative to the backplane, so reducing the fill factor slightly, these now include the additional top insulating layer. The only post-foundry step is the deposition of the reflective mirror material. It should be noted that the latter is not as flat as previously, owing to the underlying structure of the backplane.

Full planarisation is a known process in which the topology of the backplane is effectively removed by filling with a insulating material, e.g. a polymer. Again, this may be implemented on the present backplane, with or without the top insulating layer introduced at the foundry, and with very flat highly reflective mirror electrodes deposited over each pixel with a high fill factor. However, although the product has the same advantages as partial planarisation, and may be superior in performance, its production by present technologies involves a number of post-foundry steps, some not easily or efficiently performed (such as ensuring the flatness of the insulating material), and so is not preferred at the moment.

The chiral smectic liquid crystal material is given a desired surface alignment at one or both substrates by means known per se. In the case of the active semiconductor backplane, treatment will be of the partial or full planarisation layer if provided.

Circuitry The embodiment thus far described has a rectangular pixel array of 320 columns and 240 rows, the columns being supplied by parallel data lines and the rows being enabled to receive or act on the received data in turn in a desired sequence. The array is one half standard VGA resolution in each direction. It would be desirable to increase the resolution of the array to the VGA standard, and this is described later in respect to a modification Depending on the manner in which it is driven, and the value of the applied voltage, the present embodiment of a smectic liquid crystal spatial light modulator may be driven at a line rate of at least 10 MHz and a frame rate of up to 15 to 20 kHz, requiring a data input of around 1 to 1.5 Gpixel per second. Typically, while the pixel address time is around 100 nanoseconds, the pixel will actually take around 1 to 5 microseconds to switch between optical states; and while overall frame writing time is of the order of 24 microseconds, the frame to frame writing period is around 80 microseconds.

The disparity between the actual frame rate of the spatial modulator and the potential frame rate of the array (about 80 KHz) as determined by the line frequency, arises from a variety of factors such as the time necessary for the pixel elements to switch completely, (which is significantly greater than the line or pixel addressing time) and during which time charge is drawn from the cell capacitance and the slug capacitance; the need to blank the array to permit dc balancing; and optical access to the spatial light modulator between the writing of successive frames.

Figure 7:
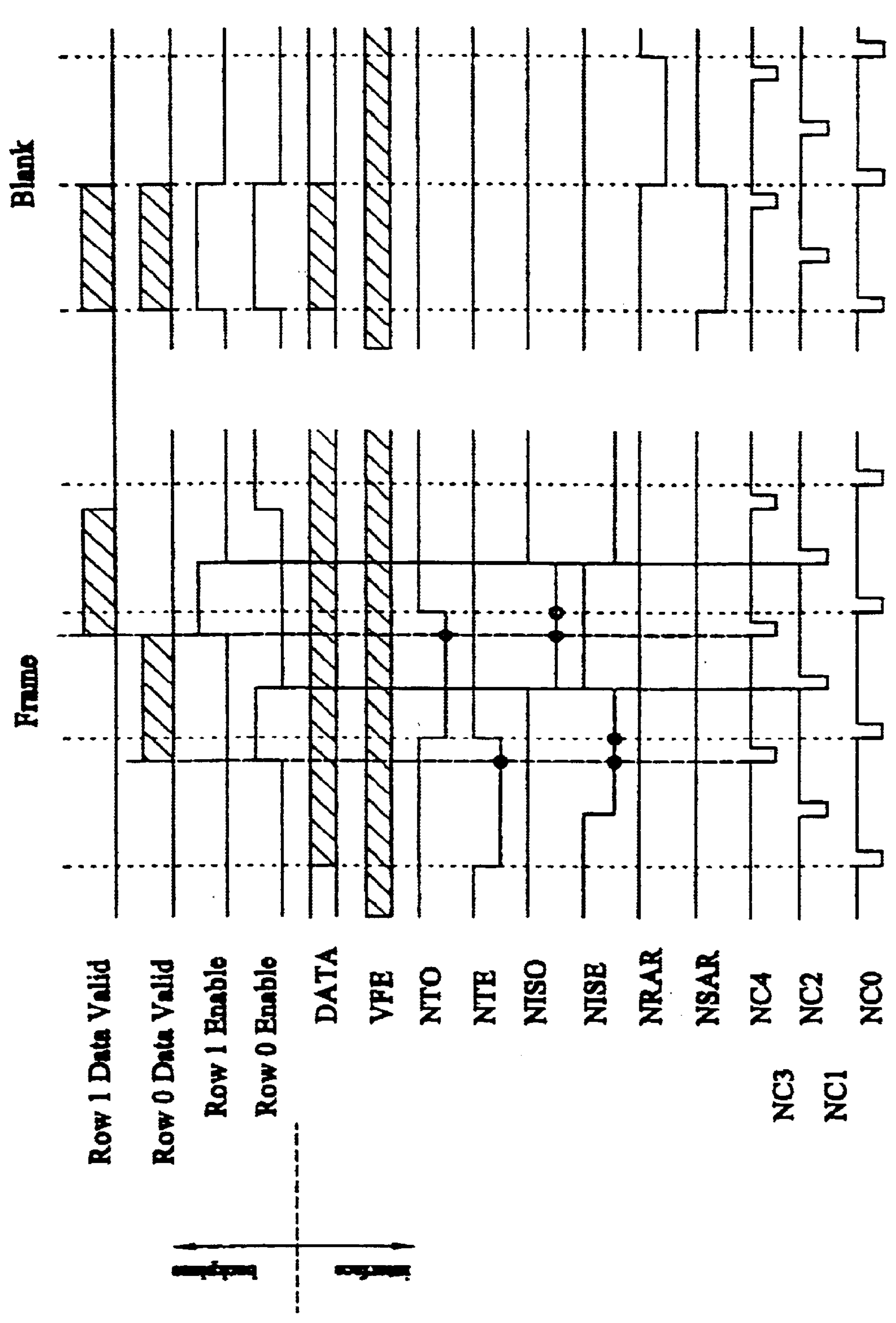
FIGS. 7 and 7*a* are waveform diagrams.
Figure 7A:
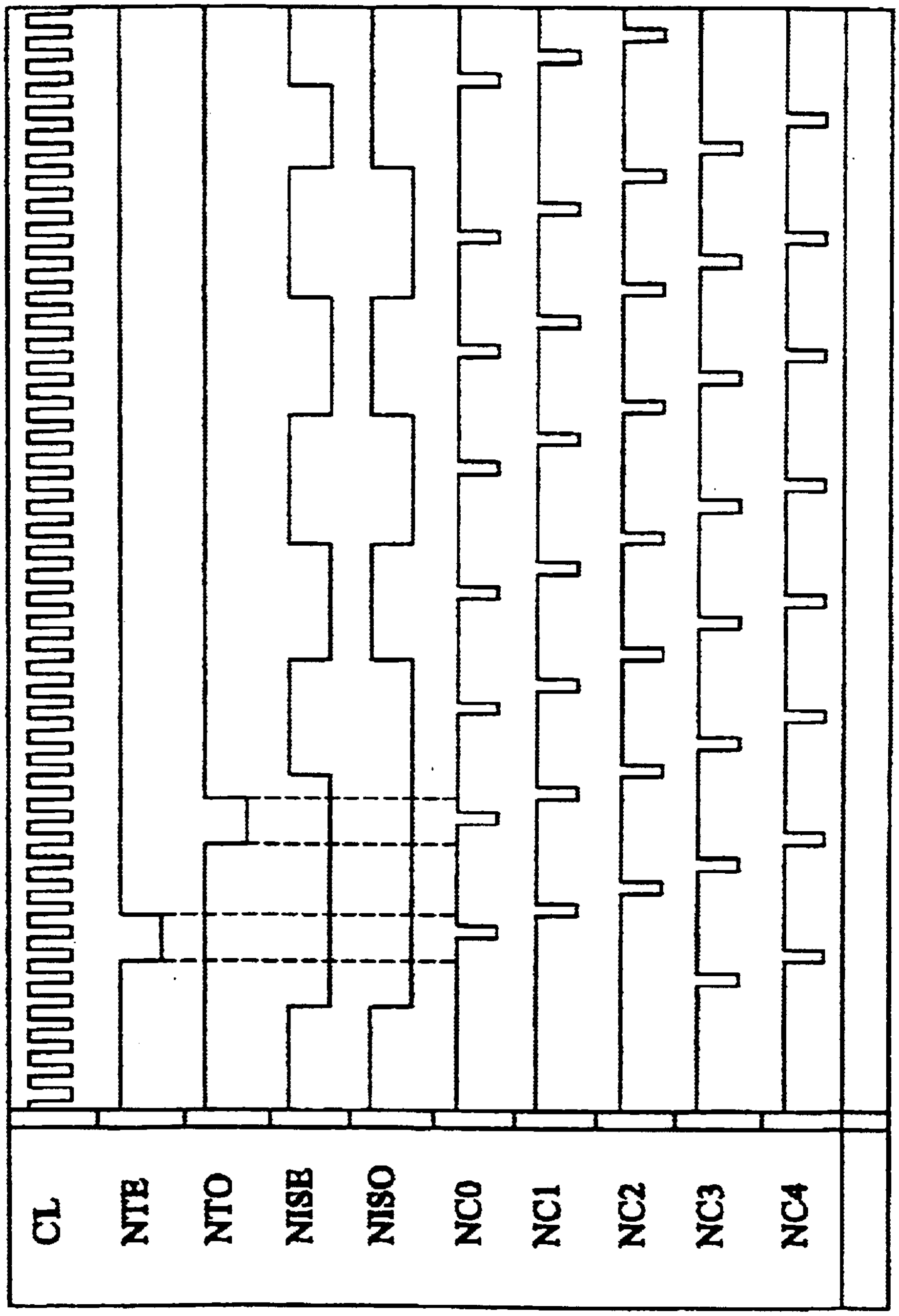

A master clock operates at 50 MHz. From the master clock pulses CL are derived in known manner the waveforms NTE, NTO, NISE, NISO, NC0 to NC4 shown in FIGS. 7 and 7*a*. The initial "N" indicates the use of negative logic in which signals are active in the low state. Where used, the inverse of these signals have the same terminology less the initial "N" . The final letters "E" and "O" refer to even and odd, as applied to rows or columns of the array.

Figure 8:
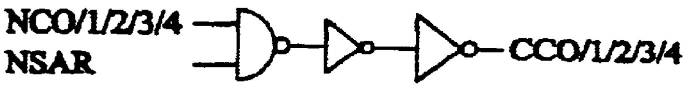
FIG. 8 is a schematic circuit diagram showing part of the control circuits of FIG. 4.
Figure 8:
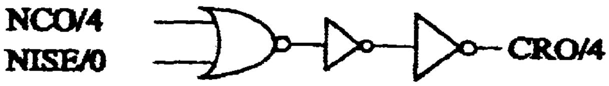
Figure 8:
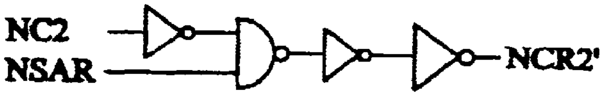
Figure 8:
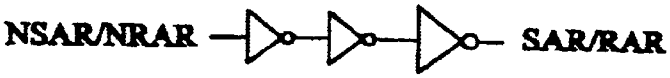

FIG. 8 illustrates parts of the control circuits 48 of FIG. 4. Here and in FIG. 7 there are further signals NSAR and NRAR for setting all rows (to blank the array) and resetting all rows (to permit rewriting of the array) respectively.

FIG. 8(*a*) indicates the derivation of 5 non-overlapping clocks (N)CC0 to (N)CC4 at the 10 MHz line frequency from the signals NC0 to NC4 when the signal NSAR is inactive, for use in controlling the column drivers 42, 43.

As already indicated with respect to FIG. 4, a group of 32 incoming parallel data lines is 1:5 demultiplexed to the 160 even columns by driver 42 at the top of the array, and a complementary group of 32 incoming parallel data lines is 1:5 demultiplexed to the 160 odd columns by driver 43 at the foot of the array. Otherwise, drivers 42 and 43 are similarly arranged.

Figure 9:
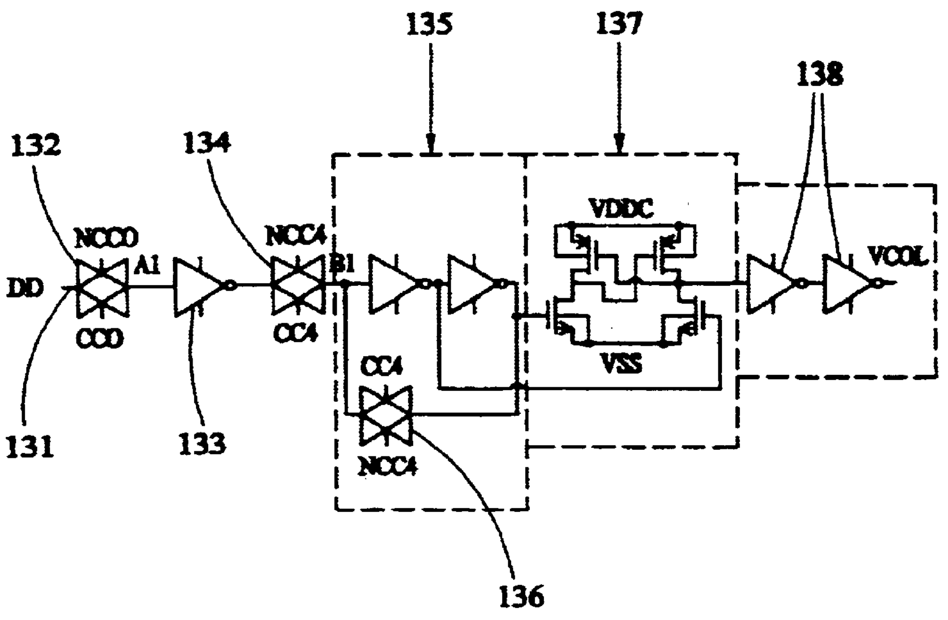
FIG. 9 is a schematic circuit diagram showing part of the column drivers of FIG. 4.

FIG. 9 shows one of 32 similar circuits of the driver 42, each for a respective single column in the first set of 32 even columns. A data signal DD from an input 131 coupled to a respective one of the 32 input data lines is transmitted by a gate 132 during the active period of clock NCC0 and held on the gate capacitor of an inverter 133 until a gate 134 controlled by clock pulse NCC4 permits transmission of the signal to a latch 135. Latch 135 is bistable and consists essentially of two inverters coupled in a ring via a further gate 136 also controlled by the gate pulse CC4, so that the ring is opened when the signal is being transmitted to the latch via the gate 134, and thereafter closed to hold the signal at the latch output. The output of the latch is connected to the column conductor via a level shifter 137 and two series coupled buffers 138.

This overall arrangement for the first set of column conductors is replicated for the remaining four sets, with the same 32 input data lines but with respective different clock signals NCC1 to NCC4 on the first gate 132 as appropriate. The signals applied to the gates 134 and 136 remain as NCC4 and CC4, so that data signals for a whole line are applied simultaneously to all 320 columns in response to the signal NCC4, and are maintained thereat until the next pulse NCC4.

When NSAR is active, it over-rides the clock pulses NCC0 to NCC4, making all 320 columns available to the 64 data input lines simultaneously.

FIG. 8(*b*) shows the derivation of 5 non-overlapping clocks (N)CR0 to (N)CR4 at the 10 MHz line frequency from the signals NC0 to NC4 when the signal NISE or NISO is inactive, for use in controlling the row drivers 44, 45.

As already described with respect to FIG. 4, even and odd rows of the array are driven (enabled) by respective scanners 44, 45, each comprising a shift register with associated level shifters at its outputs, or 120 adjacent outputs thereof. Each stage of the shift registers is fully bistable and controlled by clock pulses NCR0, NCR2 and NCR4. A single token pulse NTE, NTO is coupled into the first stage of the respective shift register at the start of each frame, and is then clocked down the register in the required manner, depending on the type of scanning required.

Figure 10:
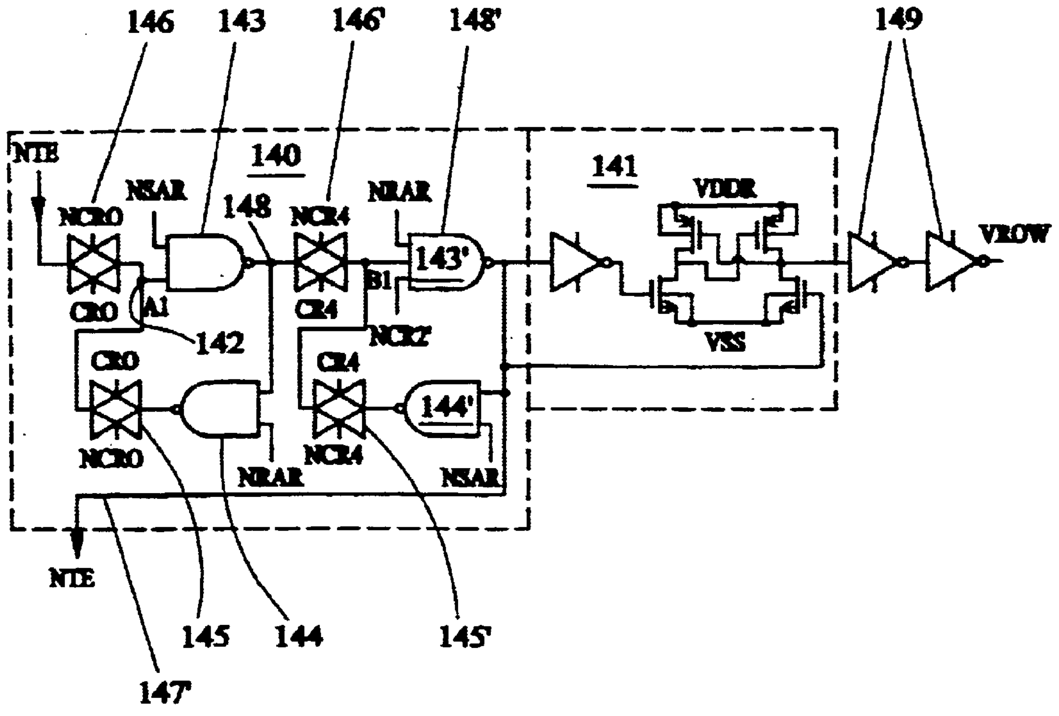
FIG. 10 is a schematic diagram showing part of the row scanners of FIG. 4.

FIG. 10 shows a single stage of the odd row scanner 44 of the preferred embodiment, including an associated level shifter unit 141 of the level shifter 44*b* coupled between a single stage 140 of the shift register 44*a* and two buffers 149. The even row scanner 45 is arranged in a similar manner.

The stage 140 comprises a pair of inverting logic gates 143, 144 coupled in a ring via a transmission gate 145. The input 142 of logic gate 143 is commonly coupled to the output of the gate 145 and to the output of a transmission gate 146 which acts to receive the output 147 (token NTE) from a preceding stage in the register. Gates 145 and 146 are respectively enabled by inverse clock signals NCR0 and CRO, whereby the ring is broken as the signal from transmission gate 146 is passed to the input of gate 143, and subsequently reformed to maintain the inverse of the received signal at an output point 148.

Gates 143', 144', 145' and 146' are arranged in similar manner to the gates 143 to 146, and act similarly but in response to clock pulses NCR4, CR4, whereby the inverse of the signal at point 148 is held at output point 148', where it is level shifted by circuit 121 and transmitted to the respective row. Thus each row is enabled in turn in response to the signal NCR4.

Each of gates 143, 144 and 144' is a NAND gate with two inputs, and the gate 143' is a NAND gate with 3 inputs. The second input to gates 143 and 144' is the signal NSAR, the second input to gates 143' and 144 is the signal NRAR, and the third input to gate 143' is a signal NCR2'. When signals NSAR, NRAR and NCR2' are inactive, the gates act as inverters and the rings are bistable.

The signal NCR2' is derived as shown in FIG. 8(*c*). It is similar to signal NCR2 but is over-ridden when signal NSAR is active. When NSAR is inactive, the effect of the clock signal NCR2 is to ensure that the second ring is reset and the row disabled before the following row is enabled, thus ensuring that data supply is to a single row, and that there can be no overlap of the same data between rows.

The control signal NSAR acts to disable the signal NCR2' and to set (latch) all outputs of the register, thereby enabling all rows for blanking in the manner described at the commencement of this section. The control signal NRAR subsequently acts to turn all the rows off again. Thus the signal NSAR over-rides the normal operation of the shift registers.

The action of the signal NSAR is thus (a) to over-ride the column clocks NCC0 to NCC5 so that all five sets of columns are simultaneously provided with data from the 64 data inputs, and (b) to disable the clock pulse NCR2' and the normal action of the register, and to latch all rows. This permits the entire array of pixels to be blanked simultaneously.

Other than when the tokens NTO and NTE are first introduced, the signals NISE and NISO are complementary. When active, their action is to inhibit the production of the row clock pulses (N)CR0 to (N)CR4, FIG. 8(*b*). In this manner only one of the shift registers 44*a,* 44*b* is active at any one time, making it possible to control the manner in which the tokens are passed down the rows. For example, if, as shown, NISE and NISO are derived so as to have one half line frequency, the registers are enabled alternately to provided a progressive or non-interlaced line scan down the array. An alternative would be to provide signals NISE and NISO in the form of pulses of one half the frame address period, so that the one register is completely scanned and then the other register is completely scanned, thus providing an interlaced scan.

Other modes are possible, for example enabling an adjacent odd and even row simultaneously, giving twice the frame rate but at half the vertical resolution.

Although in this embodiment the shift register stages are adapted to provide directly for a response to the signals NSAR and NRAR, it will be clear that alternative means could be provided as a separate entity between the registers and the rows, for example an OR gate for NSAR and an AND gate for NRAR coupled in series between a register output and the associated row.

VGA Resolution In a modification of the present embodiment, the single pixel mirror and active element is replaced by a group of four (two by two), with a corresponding doubling of the row and column address lines. To accommodate the doubling of the address lines in each dimension, the column drivers and row scanners are provided with 1:2 demultiplexers.

Figure 11:
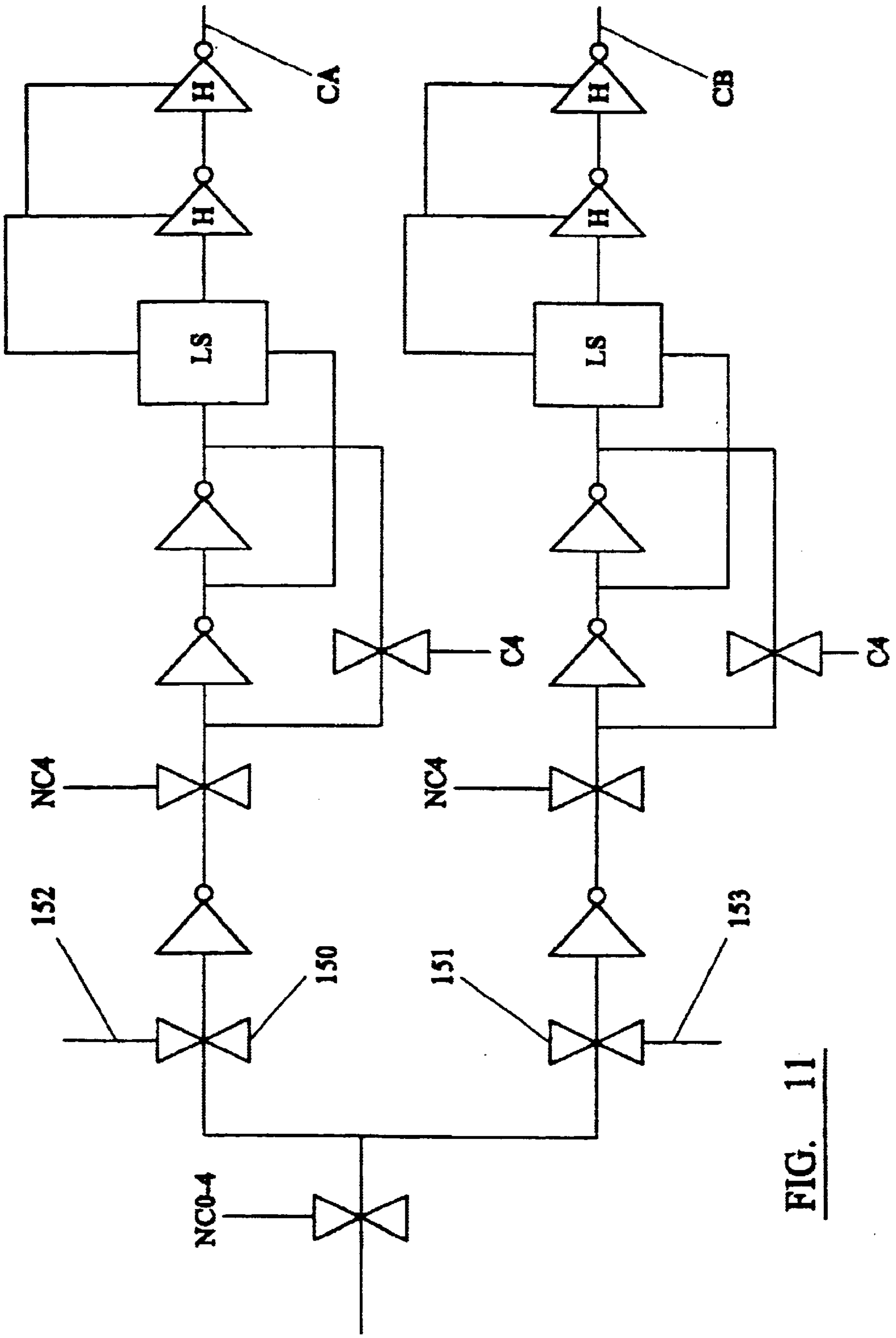
FIG. 11 shows a modification of the circuit of FIG. 9 for increasing the number of columns addressed.

The column circuits are merely doubled in number, each pair CA and CB being enabled in alternation by transmission gates 150, 151, with complementarily driven control inputs 152, 153 as illustrated schematically in FIG. 11.

Figure 12A:
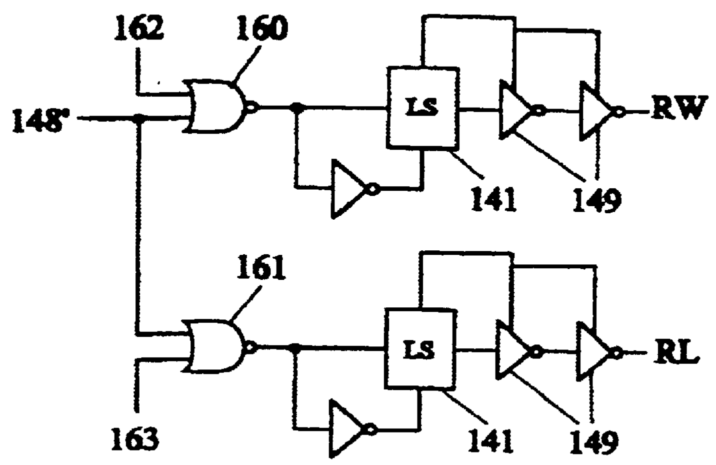
FIG. 12 shows modifications of FIG. 10 for increasing the number of rows addressed.
Figure 12B:
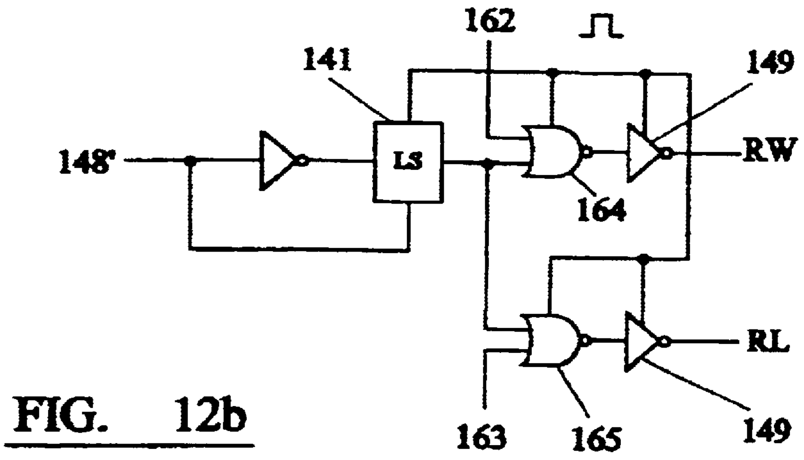
Figure 12C:
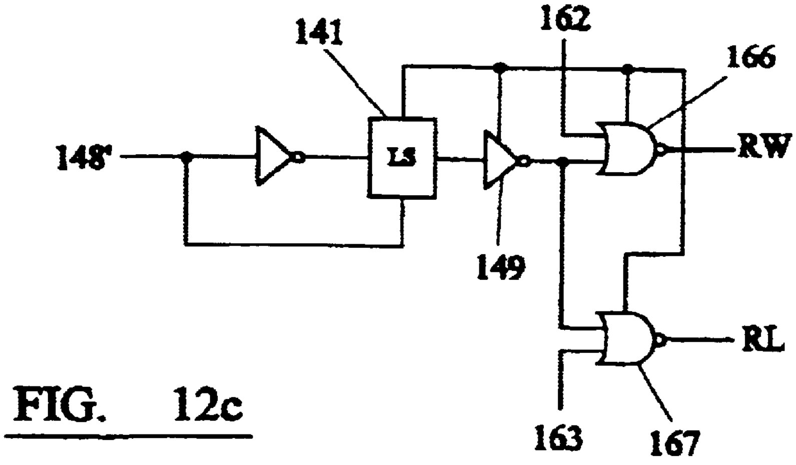

FIG. 12*a* to 12*c* illustrate three possible schemes for the row scanners. In the preferred scheme of FIG. 12*a,* logic gates 160, 161 are disposed between the output point 148' and respective level shifters 141 and buffers 149. Second inputs 162, 163 of the gates are driven in complementary fashion to enable either the upper or lower pair of pixels RU and RL.

However, as schematically shown in FIGS. 12*b* and 12*c,* the demultiplexing may be performed after the level shifter 141, respectively at gates 164, 165 between the level shifters 141 and final output stages 149', or at gates 166, 167 which also constitute the final output stage.

It will be clear that by suitable control of the signals 152 and 153, and/or 162 and 163 various other modes of writing the array will be possible, for example 4:1 row interlace schemes.

In this modification, the ratio of mirror area to pixel area is reduced, and care needs to be taken to shield the underlying active elements from incident light. The ratio of total pixel capacitance to liquid crystal cell capacitance is also somewhat reduced, from 10:1 to 8.4:1. Nevertheless, the trade-off with increased resolution is considered overall not to be disadvantageous.

Operation Spatial light modulation provides opportunities both in optical processing, for example in holographic and switching applications, where requirements are commonly very stringent in terms of factors such as timings, continuity of illumination, length of viewing, etc. Set against this, most optical processing requires only binary modulation across the image plane.

For display purposes, accommodation and temporal averaging by the eye permits more latitude in respect of the foregoing factors, but it is very commonly necessary to provide a grey scale modulation across the area of the display.

There are many ways in which the spatial light modulator of the preferred embodiment may be driven, due in part to the versatility afforded by the active backplane design.

(a) Binary/Grey Scale Thus, for example, there is a choice between binary and grey scale modulation. Grey scale modulation itself may be achieved either in an analogue manner by suitable control of the amplitude voltage applied across each pixel (cf the electroclinic effect mentioned earlier), but advantageously for display purposes the array is subject to variable temporal modulation to provide an apparent grey scale. Even more advantageously, the array is so driven on a digital basis. This aspect is covered in more detail below and also in our copending application PCT/GB99/04260, U.S. Ser. No. 09/868,242.

(b) Multiple Refresh Again, the liquid crystal material may or may not possess a relaxation time of sufficient length to cover the desired time between the production of successive images. Where it does not, the image will need to be written more than once to obtain the desired time. The high writing speed available with the embodiment is useful in this respect, in increasing the proportion of the total time in which an image is available.

(c) Front Electrode Voltage Furthermore, and broadly, the voltage applied between the common front electrode and the active backplane elements may be managed in at least two ways. Assuming that the overall voltage available from the backplane is V, it is possible to set the front electrode at V/2 whereby all pixel elements can be turned on or off as desired during a single frame scan. The penalty is the application of a lower voltage V/2 across each pixel and longer switching times, inter alia.

Alternatively, the front electrode can be driven alternately to V and zero, with the backplane being synchronously controlled so as to turn selected pixels optically on during one frame scan and to turn other selected pixels optically off during the other frame scan. The voltage applied to each pixel is higher, at V, thus increasing switching speed, but with the need to perform two frame scans to complete data entry.

These two methods will henceforth be termed “one-pass” and “two-pass” respectively. In the embodiment, the one-pass scheme permits a somewhat higher frame rate at the greatest usable voltages.

These, and other considerations such as whether to achieve overall dc balancing (and, if so, the time period over which dc balancing is to be achieved), will determine exactly how the spatial light modulation is operated.

Figure 13B:
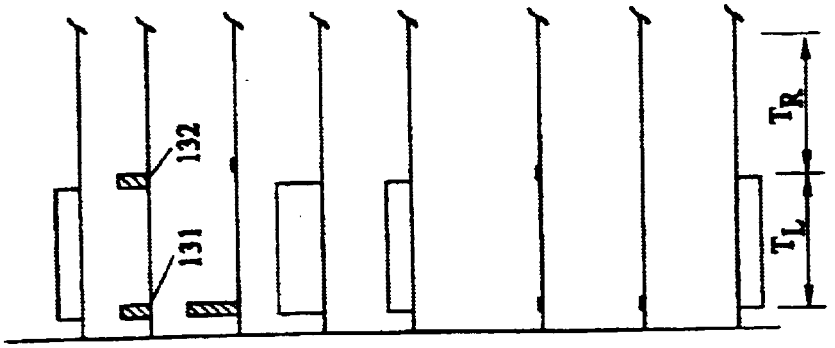
FIGS. 13*a* and 13*b* show waveforms used to illustrate a one-pass image writing scheme.
Figure 13A:
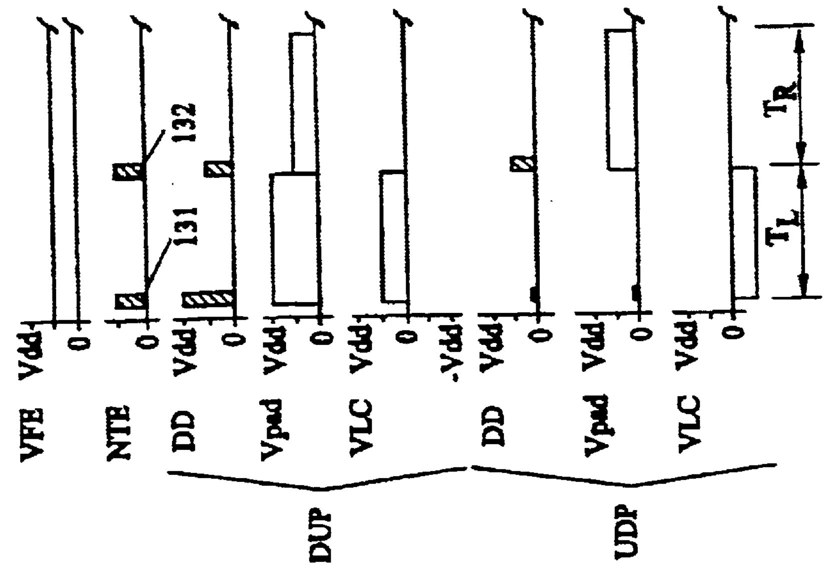
Figure 13:
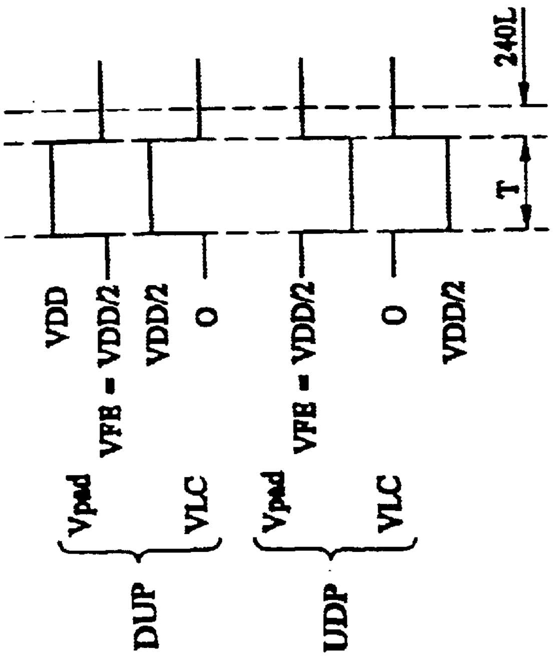

One Pass Scheme FIG. 13 illustrates voltage waveforms which can be used in a one pass scheme when the front electrode voltage VFE is at V/2. The voltage Vpad at mirror electrodes of pixels DUP in an addressed line which are to be turned from off to on are driven to a value V from the column electrodes, and for pixels UDP which are to be turned from on to off the mirror electrodes are driven to zero voltage. The resulting voltage across the liquid crystal cell is VLC. Energisation typically takes around 10 ns, although 100 ns is actually allowed in the embodiment. A significantly longer period T is allowed for the pixels actually to switch, following which all pixel electrode voltages (Vpad) are returned to voltage V/2 by altering the voltage to the level shifters and either performing a second scan or a set/reset operation using the signals NSAR and NRAR to gate all pixel transistors on and off, as shown in FIG. 13*a*. Returning the pixels to V/2 ensures that the length of application of dc is well defined and repeatable.

In FIGS. 13*a* and 13*b*, pulse 131 denotes selection of an individual row, $T_L$ denotes the time to load the array (including a period for the liquid crystal to settle), and $T_R$ is the time over which the image is read, the start only of this period being shown. Pulse 132 denotes either selection of an individual row during a second scan, or a global row select for the set/reset option.

The set/reset option is faster, and is preferred. While the length of application of dc to all pixels differs from row to row when using the set/reset option, due to the finite time taken to write the array, this is immaterial since the length of application of dc pulses to the same pixel is equal from frame to frame, and this is the important factor when contemplating dc balance. In either case, the transistor is subsequently turned off, permitting electrostatic stabilisation (see later).

Since all pixels are energised during each frame scan, liquid crystal elements which remain the same from frame to frame are repeatedly driven in the same direction, and this can give rise to problems in obtaining a zero dc balance.

Furthermore, returning all pixel electrodes to V/2 can give rise to problems where photoconduction is significant. In such a case, it is preferred to gate all pixel electrodes to zero volts synchronously with a return of the front electrode voltage VFE to zero volts subsequent to writing the frame, as shown in FIG. 13*b*.

Figure 14:
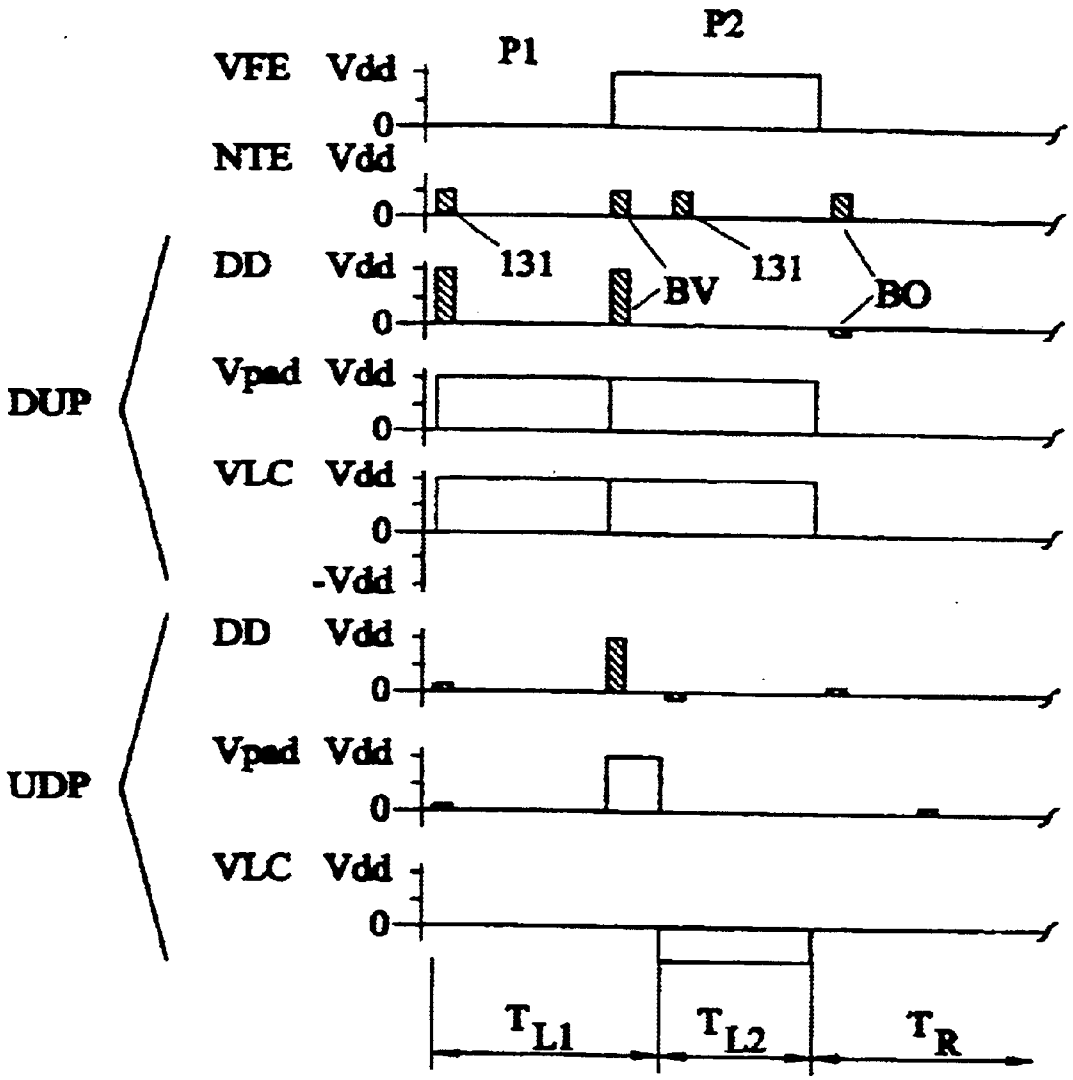
FIGS. 14 to 16 show waveforms used to illustrate two-pass image writing schemes.

Two-Pass Scheme FIG. 14 shows voltage waveforms which could be used in a two-pass scheme, over the two frame scan periods or passes P1 and P2 necessary to write the whole array. In the first pass P1, selected pixels are addressed to turn them optically on, in the second pass P2 selected pixels are addressed to turned them optically off. For periods outside the passes all voltages are zero dc, optionally with a low level ac voltage for ac stabilisation of the switched states.

Plot (i) shows the voltage VFE at the front electrode, which is raised to V volts only for the duration of the second pass P2.

Plots (ii) and (iii) are plots of the voltage Vpad at pixel mirror pads which are respectively being turned ON or OFF. During the first pass ("ON field") any pad may be switched from zero volts to V volts. A first global blank BV is applied to drive all mirror pads to V volts between the two passes. During the second pass any pad may be switched from V volts to zero volts. A second global blank B0 is applied to drive all pads to zero volts at the end of the second pass. Blanks BV and B0 are applied in substantial synchronism with the switching of the second (front) electrode.

Plot (ii) shows the voltage at a pad for a selected pixel which is to be turned on during the row scanning of the first pass, so providing a positive potential difference pulse across the associated liquid crystal element as shown in plot (iv). After the first pass the first global blank BV in association with the switching of VFE acts to reduce the potential difference across all liquid crystal elements to zero regardless of whether they have been switched or not, with both sides of the liquid crystal cells now at V volts.

Plot (iii) shows the voltage at a pad for a selected pixel which is to be turned off during the row scanning of the second pass, so providing a negative potential difference across the associated liquid crystal element as shown in plot (v). After the second pass the second global blank B0 in association with the switching of VFE acts to reduce the potential difference across all liquid crystal elements to zero regardless of whether they have been switched or not, with both sides of the liquid crystal cells now at zero volts.

Any pixel which (as an option) is not addressed during either pass, has a pad voltage which is due solely to the effect of the blanks BV and B0. As noted above, BV and B0 are substantially synchronous with the switching of VFE, so that these pixels experience zero potential difference throughout the two passes. In all cases the timing of BV and B0 relative to VFE must be such that no unwanted switching of pixels occurs.

Furthermore, although the two passes have been shown as immediately succeeding one another, as is preferred, this is not entirely necessary so long as the scheme is consistent with the required pixel switchings. For example, there could be a small delay between the passes to enable the last addressed pixels to switch completely. In such a case it would be desirable to apply BV and the switching of VFE synchronously with the commencement of the second pass.

It will be appreciated that the requirement for two passes and the application of the full available voltage V are counteracting factors, compared with the single pass and lower voltage V/2 (and therefore slower switching) of the single pass scheme. It should also be evident that it is possible to reverse the sequence of the passes of FIG. 14, with consequential modification of the blanking processes, etc.

Figure 15:
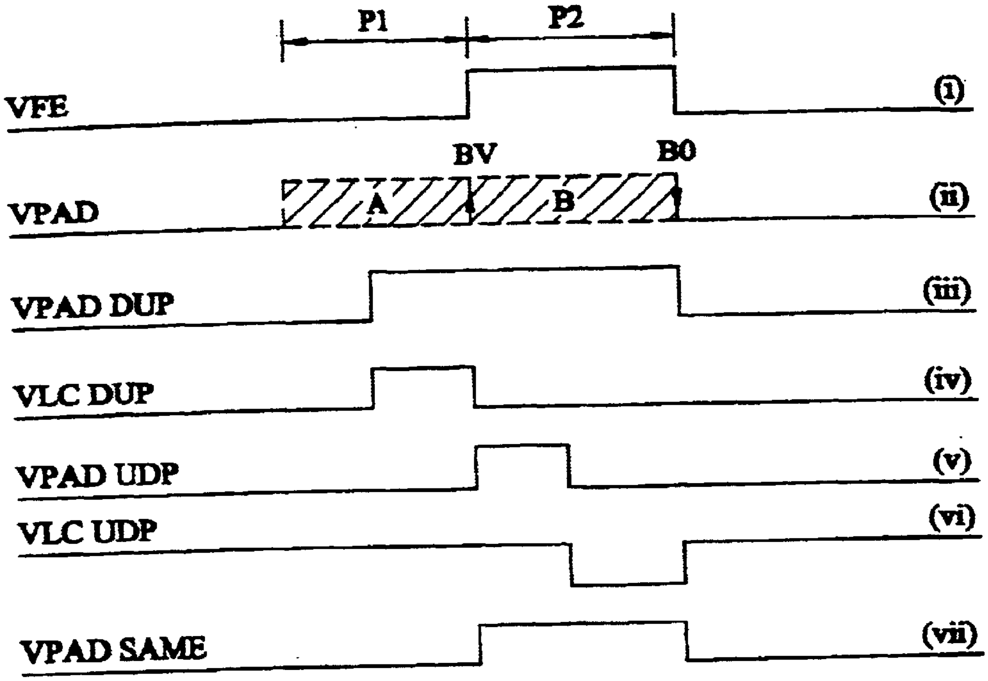

For further explanation, FIG. 15 shows simplified voltage waveforms which could be used in a similar two-pass scheme, over first and second frame scan periods or passes P1 and P2 necessary to write the whole array. In P1, selected pixels are addressed to turn them optically on, in P2 pixels are addressed to turned them optically off. For periods outside P1 and P2 all voltages are zero dc, optionally with a low level ac voltage for ac stabilisation of the switched states.

Plot (i) shows the voltage VFE at the front electrode, which is raised to V volts only for the duration of P1.

Plot (ii) is a general plot of the voltage Vpad obtainable at any pixel mirror pad. During a first period A during PI any pad may be switched from zero volts to V volts. A first global blank BV is applied to drive all mirror pads to V volts between P1 and P2. During a period B during the P2 any pad may be switched from V volts to zero volts. A second global blank B0 is applied to drive all pads to zero volts at the end of the second pass. Blanks BV and B0 are applied in synchronism with the switching of the second electrode.

Plot (iii) shows the voltage at a pad for a selected pixel which is to be turned on during the row scanning of P1, so providing a positive potential difference pulse across the associated liquid crystal element as shown in plot (iv). After P1 the first global blank BV in association with the switching of VFE acts to reduce the potential difference across all liquid crystal elements to zero regardless of whether they have been switched or not, with both sides of the liquid crystal cells now at V volts.

Plot (v) shows the voltage at a pad for a selected pixel which is to be turned off during the row scanning of P2, so providing a negative potential difference across the associated liquid crystal element as shown in plot (vi). After P2 the second global blank B0 in association with the switching of VFE acts to reduce the potential difference across all liquid crystal elements to zero regardless of whether they have been switched or not, with both sides of the liquid crystal cells now at zero volts.

Plot (vii) shows the voltage pulse at a pad for any pixel which (as an option) is not addressed during either P1 or P2, and which is due solely to the effect of the blanks BV and B0. BV and B0 are substantially synchronous with the switching of VFE, so that these pixels experience zero potential difference throughout the two passes. In all cases the timing of BV and B0 relative to VFE must be such that no unwanted switching of pixels occurs.

Furthermore, although P1 and P2 have been shown as immediately succeeding one another, as is preferred, this is not entirely necessary so long as the scheme is consistent with the required pixel switchings. For example, there could be a small delay between P1 and P2 to enable the last addressed pixels to switch completely. In such a case it would be desirable to apply BV and the switching of VFE synchronously with the commencement of P2.

Figure 16:
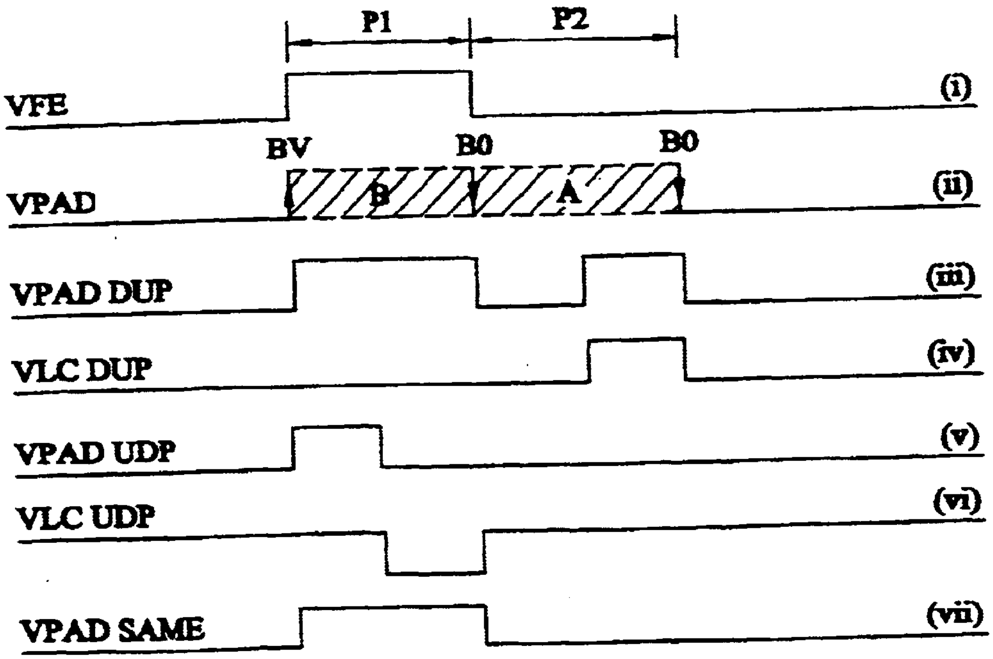

It will be appreciated that the requirement for two passes and the application of the full available voltage V are counteracting factors, compared with the single pass and lower voltage V/2 (and therefore slower switching) of the single pass scheme. It should also be evident that it is possible to reverse the sequence of P1 and P2 of FIG. 15, with consequential modification of the blanking processes, etc. as shown in FIG. 16 using the same schematic type of illustration with corresponding references.

Binary Imaging. A binary image may be written from a blank image or an existing image, by a 1-pass method as has been described above However, starting from a blank image, writing a new image and subsequently reversing the voltages applied to each respective pixel to achieve dc balance does not result in reversion of the optical image to a blank one, but to a reverse optical image. In addition, the time averaged optical image is zero if the positive and reverse images are held for equal times, so it may well be necessary to interrupt the illumination (or the viewing step) in order to see a positive image.

Furthermore, merely allowing the addressed pixels to relax, or driving all pixels to one state (relatively fast), for example by applying the global set signal NSAR to the array together with control of the column and front electrode voltages so as to short all pixels (zero volts) or drive them (plus or minus V), does not provide dc balance, although an optically uniform image results.

There are similar difficulties if starting with an existing image.

A two-pass scheme, for example of the type illustrated in FIG. 14, can be operated in a number of ways.

In a first two-pass scheme according to the first aspect of the invention, an existing image may be replaced by a new image simply by turning all appropriate pixels on during the first pass, and by turning the complementary set of pixels off during the second pass (as in FIG. 14), i.e. all "1"s in the new image are first addressed, regardless of whether the pixel is already "1", and subsequently all "0"s in the new image are addressed regardless of whether the pixel is already "0". No pixel is unaddressed.

This scheme suffers from the same drawback as the single pass scheme that all pixels are addressed for each image regardless of their existing state, and dc balance is not directly effected. However, it is computationally easy and fast.

In a second two-pass scheme, any liquid crystal element is only driven on or off when a change of state therein is required, otherwise it remains unaddressed and follows plot (vii). Each pixel is therefore subjected only to alternate turn-on and turn-off pulses of well-defined and equal lengths, thus automatically affording dc balance in the long term. This type of scheme is disclosed International Patent Application No. WO 92/04710 mentioned previously.

For this scheme to work successfully over an extended period, it is necessary that the pixels are not allowed to relax between successive energisations, for example by application of ac stabilisation between scans as mentioned above.

This scheme also requires a determination of the differences between the existing image and the required image in order that the pixels to be driven in each of the two passes may be determined. Thus the advantage of automatic long term dc balance is partially offset by increased computational difficulty relative to the first two-pass scheme.

Figure 17:
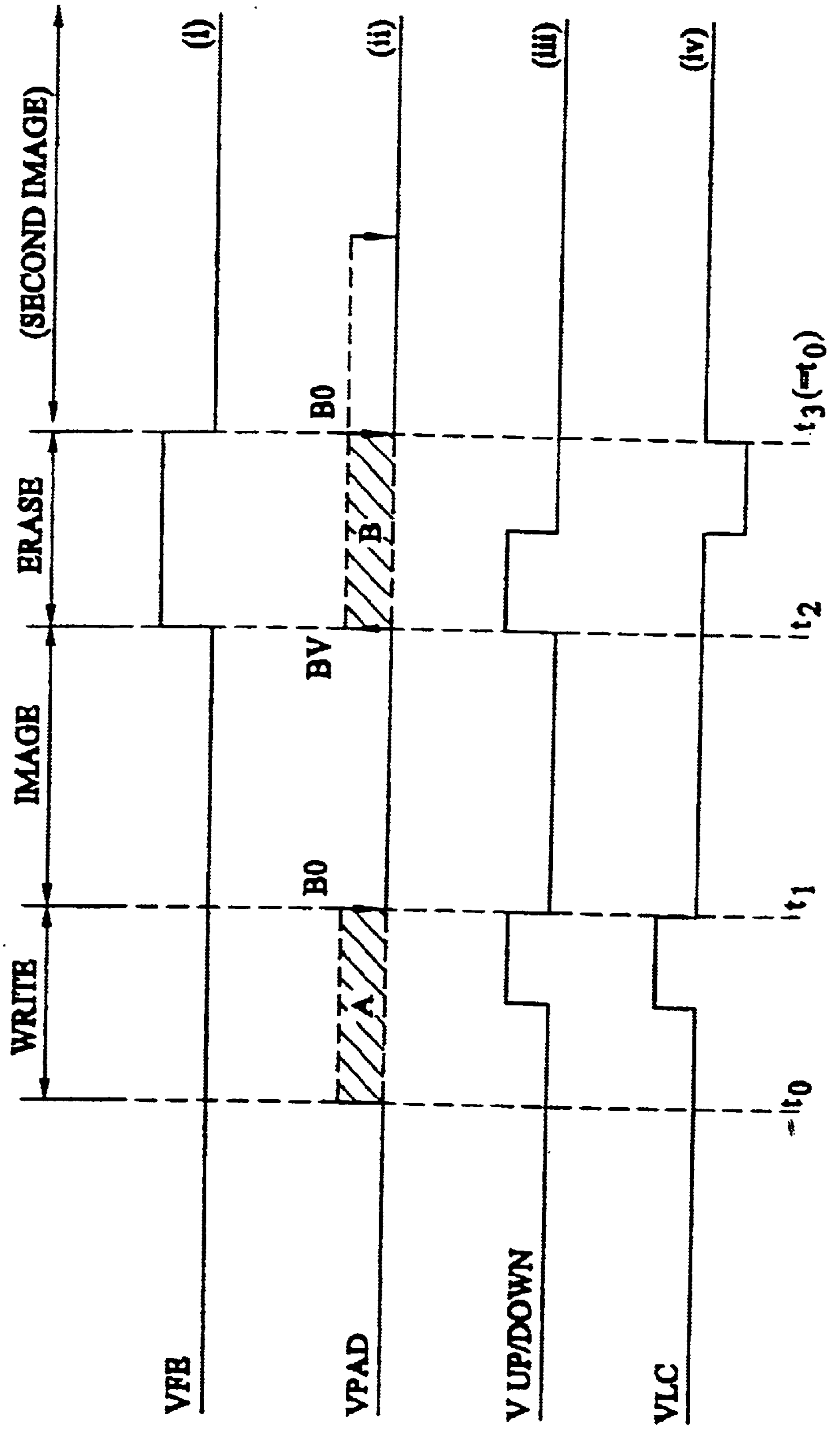
FIG. 17 shows waveforms for illustrating a modification of the scheme of FIGS. 14–16.

A third and preferred scheme, which is a modification of the two-pass scheme of FIG. 14, and which is illustrated in FIG. 17, enables a series of binary images to be written in succession, with dc balance, and with fast or driven erasure. Plots (iii) and (iv) of FIG. 17 illustrate mirror pad voltages and pixels potential differences for a pixel which is selected. This scheme is in accordance with the invention, with alternate blank image.

During a first WRITE period t0 to t1, a first image is written from a blank array of elements, by controlling the writing process so that only those elements which need to be turned on are driven (during the period A of plot (ii)), all other elements receiving zero volts. While similar to pass P1 of two pass scheme of FIG. 14, the WRITE step is followed, preferably immediately at time t1, by a first global blank B0 to zero volts, and VFE remains at zero volts, as a shown in plot (i) of FIG. 16. For an IMAGE period t1 to t2 the required binary image remains unaltered.

Subsequent erasure to a blank array is then effected during an ERASE period t2 to t3 by writing the negative image to the written pixels only. This is effected by applying a second global blank BV to V volts at time t2, synchronously with switching of VFE, and then during a period B addressing only those elements which were previously turned on, the other elements again receiving zero volts. At t3, a third global blank B0 to zero volts is applied synchronously with switching to zero volts of VFE. The erasure step is therefore generally similar to the second pass of FIG. 14.

Thus, the driven elements alternately receive opposed voltages to provide dc balance, and the other unselected elements receive no voltage and so remain balanced.

After time t3 it is possible to commence the writing of another binary image, and, as illustrated, this may commence substantially at time t3.

Thus, this third two-pass scheme resembles the second two-pass scheme above in that the full voltage V can be applied in different directions during the two passes of writing and erasure, but differs therefrom in that it is the same group of selected pixels which are addressed each time rather than different non-complementary groups, so reducing computational requirements. It differs from the one-pass method in which all elements are necessarily driven one way or the other during the frame scan.

An advantage of this third scheme as particularly illustrated is that the time averaged image is non-zero, regardless of the lengths of the writing, erasing and "viewing"

processes, since it alternates between image and blank rather than image and inverse image, and this permits optical illumination to be continuous.

A further consideration is that while the writing stage may be followed by a period of time during which the image is "viewed" or utilised, there is no need to hold the blank image obtained after erasure for any length of time. As particularly illustrated in FIG. 17, once all the pixels have switched back to their initial state, a further writing stage may commence immediately. Since the ratio of the IMAGE period to the WRITE and ERASE periods times may be large, the image is available for a large fraction of the total time, and its contrast ratio is correspondingly improved.

Although the above and other imaging schemes herein have been illustrated as employing global blanks, it should be noted that any or all of the blanks could be replaced by a further frame scan in which all columns are held at the blanking voltage. These provision of circuitry enabling a global addressing step forms the subject of our copending application PCT/GB99/04274, U.S. Ser. Nos. 09/868,218 and 10/094,958.

While some of the binary schemes above automatically provide dc balance, a further option for schemes which do not do this is to allow dc imbalance to accumulate, for example while writing images and then allowing them to relax, calculating the imbalance (e.g. in an accompanying computer simulation), and then applying local dc voltages to the pixels of a magnitude and duration such as to provide zero average dc.

Grey Scales Temporal digital modulation to achieve a grey scale effect is known, using multiple bit planes representative of a sequence of binary images. The effective duration of the binary images (length and/or number of repeats) is such that temporal integration thereof, for example by a viewer, gives the grey scale image.

Although repetition of identical binary images may be involved in such a sequence, the production of effective grey scales is best effected by the use of weighted bit planes where possible. In such a scheme, the grey scale image is decomposed into multiple binary images (bit planes) of differing duration such that temporal integration thereof, for example by a viewer, gives the grey scale image. The decomposition of the grey scale image and the corresponding durations of the bit planes, are typically on a binary basis, although other weightings could be used.

The different bit planes for a grey scale image can be stored as sequential binary strings in a computer, and will be read out one at a time in any desired order after which they can be discarded unless the image needs to be repeated. It is computationally easiest to read out the bit planes in the order in which they have been stored, since then the only address which needs to be stored is the starting address of the first stored bit planes, all bit planes then being read out one at a time simply by clocking out a predetermined number of data bits in sequence for each bit planes.

It might be possible immediately to replace bit planes that have been read by the bit planes for a succeeding image, particularly where the bit planes are being produced in real time. However, under other circumstances this could be difficult, and the set of bit planes for a successive image will then normally be stored elsewhere. In certain cases it would be possible to provide storage for just two bit planes one of which is written while the other is being read, and vice versa.

It would also be possible to control the reading and/or writing processes so as to convert the image standards as desired, for example from line sequential to interlaced.

As or after each bit plane is read from memory, it is then written, e.g. using the single pass scheme described above, and viewed over a period corresponding to its weighting so that the eye synthesises the intended grey scale image. The single pass scheme is preferred insofar as it merely overwrites the preceding bit frame without the need for a second pass, the associated front electrode switching and blanking pulses. The avoidance of lost time between successive valid images enables continuous illumination and the easier provision of bit frames of an accurately weighted duration.

In such a scheme, each pixel is subjected to a series of voltage pulses according to the point in the grey scale it represents (as in the number representing the grey scale level, and usually but not necessarily in that order). There are more points in the grey scale than there are applications of voltages, due to the weighting employed, which is advantageous since it reduces the time spent actually driving the array. Each applied voltage may be of the same or opposed polarity compared to the preceding voltage, and the same number of voltage pulses, equal to the number of bit planes (ignoring polarity), is applied to each pixel to synthesise the image.

For example, in a 64 level grey scale with binary weighting, there will be 6 bit planes with relative durations of 2*t where n ranges from 0 to 5, and each pixel can be represented by a corresponding 6 digit binary number.

However, double pass schemes could alternatively be adapted for use in multiple or weighted bit plane schemes.

To achieve dc balance, it would be possible to produce each binary bit plane by any of the binary imaging methods described in the preceding section which itself produces dc balance—for example by starting from a blank image, writing, viewing and erasing the binary image by selective energisation (+V) and driven blanking (−V) of selected pixels only.

However, in most or all of such schemes, the actual duration of the binary image is not directly proportional to the time allocated thereto, for example because of intervening blanking steps, etc., leading to a degree of distortion in the binary nature of the bitplane periods, and hence the perceived grey scale values. While this could be compensated for if desired, it represents an additional complication.

There are other schemes, the subject of our copending application PCT/GB99/04260, U.S. Ser. No. 09/868,242 in which dc balance is approached or achieved in ways other than be employing dc balanced binary images per se.

It should be understood that although much of the description above is in terms of a liquid crystal cell incorporating an addressable array, the array of the invention may be used in any cell construction irrespective of whether or not the cell is intended to function as a light modulator or display, and irrespective of whether or not the contents of the cell are intended to have a liquid crystal phase.

Furthermore, although the term "grey scale" is used herein, it should be made clear that the term is used in relation to any colour, including white. In addition, although the methods, arrays, backplanes, circuitry etc. of the invention are described in relation to a single colour (monochrome images), including white, it is envisaged that variable colour images or displays etc. will be produced in manners known per se, such as by spatially subdividing a single array into different colour pixels, superimposing displays from differently coloured monochrome arrays for example by projection, or temporal multiplexing, for example sequential projection of red green and blue images.

What is claimed is:

1. A method of controlling an array of optical elements in a succession of cycles to alter their states according to respective ones of a series of input data sets, each cycle comprising a first step wherein selected elements only of an optically blank or uniform array are written as determined by a respective data set, and a second step wherein the selected elements are selectively erased to restore a blank array prior to another cycle.

2. A method according to claim 1 wherein the array of optical elements to which the method is applied comprises a corresponding array of addressable active elements, and an electrode spaced from said corresponding array, each optical element being defined between said spaced electrode and a corresponding active element, and wherein during the said first step the active elements of a first set and the spaced electrode are operated to apply a first potential difference across the selected optical elements of the first set, and during the said second step the active elements of a second set and the spaced electrode are operated to apply a second potential difference across the selected optical elements of the second set, the first and second potential difference having opposite signs.

3. A method according to claim 2 wherein said first and second potential differences have equal amplitudes.

4. A method according to claim 2 wherein between the first and second said steps voltages on the spaced electrode and on each element of the array are all shifted substantially simultaneously by the same amount and in the same direction relative to a reference voltage.

5. A method according to claim 1 wherein the array of optical elements to which the method is applied comprises a corresponding array of addressable active elements, and an electrode spaced from said corresponding array, each optical element being defined between said spaced electrode and a corresponding active element, and wherein between the first and second said steps voltages on the spaced electrode and on each element of the array are all shifted substantially simultaneously by the same amount and in the same direction relative to a reference voltage.

6. A method according to claim 4 or claim 5 wherein said shift in voltage is applied to said spaced electrode only for substantially the duration of said second step.

7. A method according to claim 1, wherein between said first step and said second step is a step of simultaneously addressing all the optical elements of the array so as to impose zero potential difference thereacross.

8. A method according to claim 1, wherein between said first step and said second step is a step is simultaneously addressing all the optical elements of the array so as to impose a finite dc potential difference thereacross.

9. A method according to claim 7 wherein the optical elements are capacitative and subsequent to said simultaneous addressing all the optical elements are rendered open circuit.

10. A method according to claim 1, wherein between said first step and said second step in a step of simultaneously addressing all the optical elements of the array so as to impose a finite ac potential difference thereacross.

11. A method of synthesising a multi-level image using a multiple or weighted bit plane techniques in which each bit plane is written by a method as defined in claim 1.

12. A method according to claim 11, wherein the said method for writing each bit plane provides dc balancing.

13. An electro-optic arrangement comprising:

an array of electro-optic elements; and control means responsive to a series of input data sets, the control means being arranged to respond to each data set so that starting with an optically blank or uniform array of elements in a first step, the selected elements are written as determined by the data set, and in a second step, the selected elements are selectively erased to revert to a blank array prior to writing elements as determined by a successive data set.

14. An arrangement according to claim 13 wherein said array of electro-optic elements is defined by corresponding pixel electrodes of an active backplane.

15. An arrangement according to claim 14 wherein said active backplane is a semiconductor backplane.

16. An arrangement according to any one of claims 13 to 15 wherein said electro-optic elements comprise liquid crystal material located between said pixel electrodes and a spaced electrode.

17. An arrangement according to claim 16 wherein said spaced electrode is a single electrode common to all said electro-optic elements.

18. An arrangement according to claim 13, wherein the electro-optic elements are bistable.

19. An arrangement according to claim 13, wherein the electro-optic elements are monostable with a finite relaxation time.

20. An arrangement according to claim 13, wherein said array comprises a plurality of mutually exclusive sets of said elements, means arranged to address said sets one at a time, and means for addressing more than one of said plurality of sets simultaneously.

* * * * *